United States Patent
Fellows et al.

(10) Patent No.: US 12,463,985 B2
(45) Date of Patent: Nov. 4, 2025

(54) ENDPOINT AGENT CLIENT SENSORS (cSENSORS) AND ASSOCIATED INFRASTRUCTURES FOR EXTENDING NETWORK VISIBILITY IN AN ARTIFICIAL INTELLIGENCE (AI) THREAT DEFENSE ENVIRONMENT

(71) Applicant: Darktrace Holdings Limited, Cambridge (GB)

(72) Inventors: Simon David Lincoln Fellows, Cambridge (GB); Jack Benjamin Stockdale, Cambridge (GB); Thomas Alexander Chesney Jenkinson, Kent (GB)

(73) Assignee: Darktrace Holdings Limited, Cambridge (GB)

( * ) Notice: Subject to any disclaimer, the term of this patent is extended or adjusted under 35 U.S.C. 154(b) by 609 days.

(21) Appl. No.: 17/323,850

(22) Filed: May 18, 2021

(65) Prior Publication Data
US 2021/0273953 A1 Sep. 2, 2021

Related U.S. Application Data

(63) Continuation-in-part of application No. 16/279,039, filed on Feb. 19, 2019, now Pat. No. 11,477,219.
(Continued)

(51) Int. Cl.
*H04L 9/40* (2022.01)
*G06N 5/04* (2023.01)
*G06N 20/00* (2019.01)

(52) U.S. Cl.
CPC .......... *H04L 63/1416* (2013.01); *G06N 5/04* (2013.01); *G06N 20/00* (2019.01)

(58) Field of Classification Search
CPC ............. H04L 63/1416; H04L 63/1425; H04L 63/1441; G06F 21/554
See application file for complete search history.

(56) References Cited

U.S. PATENT DOCUMENTS 6,154,844 A 11/2000 Touboul et al.
6,965,968 B1 11/2005 Touboul
(Continued)

FOREIGN PATENT DOCUMENTS

EP 2922268 A1 9/2015
WO 2001031420 A2 5/2001
(Continued)

OTHER PUBLICATIONS

Gharan, Shayan Oveis, "Lecture 11; Clustering and the Spectral Partitioning Algorithm" May 2, 2016, 6 pages.
(Continued)

*Primary Examiner* — Robert B Leung
(74) *Attorney, Agent, or Firm* — Rutan and Tucker, LLP

(57) ABSTRACT

Endpoint agent cSensors can be used to extend network visibility and enhance tracking capabilities for a cyber security and threat defense environment. The cSensor may comprise a network module to monitor network information coming into and out of the endpoint computing device to ingest a first set of traffic data from network connections. The cSensor may have a collation module to collect the first set of traffic data and obtain input data related to observed network events. An analyzer module can receive the input data and use an intelligent DPI engine to perform predetermined levels of DPI from two or more possible levels of DPI on the input data based on network parameters. The cSensor may have a communication module to transmit a second set of traffic data to a cyber security appliance based on the specified DPI performed. Furthermore, the cSensor may have an autonomous action module to perform autonomous
(Continued)

action(s) in response to autonomous action(s) correlated to the received second set of traffic data.

20 Claims, 17 Drawing Sheets

Related U.S. Application Data

(60) Provisional application No. 63/026,446, filed on May 18, 2020, provisional application No. 62/632,623, filed on Feb. 20, 2018.

(56) References Cited

U.S. PATENT DOCUMENTS

| | | |
|---|---|---|
| 7,307,999 B1 | 12/2007 | Donaghey |
| 7,418,731 B2 | 8/2008 | Touboul |
| 7,448,084 B1 | 11/2008 | Apap et al. |
| 7,890,869 B1 | 2/2011 | Mayer et al. |
| 8,312,540 B1 | 11/2012 | Kahn et al. |
| 8,661,538 B2 | 2/2014 | Cohen-Ganor et al. |
| 8,819,803 B1 | 8/2014 | Richards et al. |
| 8,879,803 B2 | 11/2014 | Ukil et al. |
| 8,966,036 B1 | 2/2015 | Asgekar et al. |
| 9,043,905 B1 | 5/2015 | Allen et al. |
| 9,106,687 B1 | 8/2015 | Sawhney et al. |
| 9,185,095 B1 | 11/2015 | Moritz et al. |
| 9,213,990 B2 | 12/2015 | Adjaoute |
| 9,348,742 B1 | 5/2016 | Brezinski |
| 9,401,925 B1 | 7/2016 | Guo et al. |
| 9,516,039 B1 | 12/2016 | Yen et al. |
| 9,516,053 B1 | 12/2016 | Muddu et al. |
| 9,641,544 B1 | 5/2017 | Treat et al. |
| 9,712,548 B2 | 7/2017 | Shmueli et al. |
| 9,727,723 B1 | 8/2017 | Kondaveeti et al. |
| 10,237,298 B1 | 3/2019 | Nguyen et al. |
| 10,268,821 B2 | 4/2019 | Stockdale |
| 10,419,466 B2 | 9/2019 | Ferguson |
| 10,516,693 B2 | 12/2019 | Stockdale et al. |
| 10,701,093 B2 | 6/2020 | Dean |
| 2002/0174217 A1 | 11/2002 | Anderson et al. |
| 2002/0186698 A1 | 12/2002 | Ceniza |
| 2003/0070003 A1 | 4/2003 | Chong et al. |
| 2004/0083129 A1 | 4/2004 | Herz |
| 2004/0167893 A1 | 8/2004 | Matsunaga et al. |
| 2005/0065754 A1 | 3/2005 | Schaf et al. |
| 2007/0118909 A1 | 5/2007 | Muddu et al. |
| 2007/0294187 A1 | 12/2007 | Scherrer |
| 2008/0005137 A1 | 1/2008 | Surendran et al. |
| 2008/0077358 A1 | 3/2008 | Marvasti |
| 2008/0109730 A1 | 5/2008 | Coffman et al. |
| 2009/0106174 A1 | 4/2009 | Battisha et al. |
| 2009/0254971 A1 | 10/2009 | Herz et al. |
| 2010/0009357 A1 | 1/2010 | Nevins et al. |
| 2010/0095374 A1 | 4/2010 | Gillum et al. |
| 2010/0107254 A1 | 4/2010 | Eiland et al. |
| 2010/0125908 A1 | 5/2010 | Kudo |
| 2010/0235908 A1 | 9/2010 | Eynon et al. |
| 2010/0299292 A1 | 11/2010 | Collazo |
| 2011/0093428 A1 | 4/2011 | Wisse |
| 2011/0213742 A1 | 9/2011 | Gillum et al. |
| 2011/0261710 A1 | 10/2011 | Chen et al. |
| 2012/0096549 A1 | 4/2012 | Amini et al. |
| 2012/0137367 A1 | 5/2012 | Dupont et al. |
| 2012/0151582 A1 | 6/2012 | Reasor et al. |
| 2012/0209575 A1 | 8/2012 | Barbat et al. |
| 2012/0210388 A1 | 8/2012 | Kolishchak |
| 2012/0284791 A1 | 11/2012 | Miller et al. |
| 2012/0304288 A1 | 11/2012 | Wright et al. |
| 2013/0091539 A1 | 4/2013 | Khurana et al. |
| 2013/0198119 A1 | 8/2013 | Eberhardt, III et al. |
| 2013/0198840 A1 | 8/2013 | Drissi et al. |
| 2013/0254885 A1 | 9/2013 | Devost |
| 2014/0007237 A1 | 1/2014 | Wright et al. |
| 2014/0013434 A1* | 1/2014 | Ranum .............. G06F 21/564 726/24 |
| 2014/0074762 A1 | 3/2014 | Campbell |
| 2014/0165207 A1 | 6/2014 | Engel et al. |
| 2014/0215618 A1 | 7/2014 | Cochenour |
| 2014/0325643 A1 | 10/2014 | Bart et al. |
| 2015/0067835 A1 | 3/2015 | Chong et al. |
| 2015/0081431 A1 | 3/2015 | Akahoshi et al. |
| 2015/0161394 A1 | 6/2015 | Ferragut et al. |
| 2015/0163121 A1 | 6/2015 | Mahaffey et al. |
| 2015/0172300 A1 | 6/2015 | Cochenour |
| 2015/0180893 A1 | 6/2015 | Im et al. |
| 2015/0213358 A1 | 7/2015 | Cochenour |
| 2015/0281287 A1 | 10/2015 | Gill |
| 2015/0286819 A1 | 10/2015 | Coden et al. |
| 2015/0310195 A1 | 10/2015 | Bailor et al. |
| 2015/0319185 A1 | 11/2015 | Im et al. |
| 2015/0341379 A1 | 11/2015 | Lefebvre et al. |
| 2015/0363699 A1 | 12/2015 | Nikovski |
| 2015/0379110 A1 | 12/2015 | Marvasti et al. |
| 2016/0062950 A1 | 3/2016 | Brodersen et al. |
| 2016/0078365 A1 | 3/2016 | Baumard |
| 2016/0149941 A1 | 5/2016 | Amit |
| 2016/0164902 A1 | 6/2016 | Moore |
| 2016/0173509 A1 | 6/2016 | Thakur et al. |
| 2016/0241574 A1* | 8/2016 | Kumar ................ H04L 63/12 |
| 2016/0241576 A1 | 8/2016 | Rathod et al. |
| 2016/0285858 A1 | 9/2016 | Li et al. |
| 2016/0352768 A1 | 12/2016 | Lefebvre et al. |
| 2016/0359695 A1 | 12/2016 | Yadav et al. |
| 2016/0373476 A1 | 12/2016 | Dell'Anno et al. |
| 2016/0373477 A1 | 12/2016 | Moyle et al. |
| 2017/0054745 A1 | 2/2017 | Zhang et al. |
| 2017/0063907 A1 | 3/2017 | Chari et al. |
| 2017/0063910 A1 | 3/2017 | Lemmond et al. |
| 2017/0063911 A1 | 3/2017 | Muddu et al. |
| 2017/0169360 A1 | 6/2017 | Veeramachaneni et al. |
| 2017/0220801 A1 | 8/2017 | Stockdale et al. |
| 2017/0230391 A1 | 8/2017 | Ferguson et al. |
| 2017/0230392 A1 | 8/2017 | Stockdale |
| 2017/0237721 A1* | 8/2017 | Backholm .......... H04L 41/5009 370/252 |
| 2017/0244734 A1* | 8/2017 | Kinder ................ H04L 63/20 |
| 2017/0251012 A1 | 8/2017 | Stockdale et al. |
| 2017/0270422 A1 | 9/2017 | Sorakado |
| 2018/0027006 A1 | 1/2018 | Zimmermann et al. |
| 2018/0145915 A1 | 5/2018 | Caputo, II et al. |
| 2018/0167402 A1 | 6/2018 | Scheidler et al. |
| 2018/0183680 A1 | 6/2018 | Chen et al. |
| 2018/0205746 A1* | 7/2018 | Boutnaru ............ H04L 43/062 |
| 2018/0255076 A1 | 9/2018 | Paine |
| 2018/0307833 A1 | 10/2018 | Noeth et al. |
| 2018/0332054 A1 | 11/2018 | Ford |
| 2018/0375886 A1 | 12/2018 | Kirti Ganesh |
| 2019/0036948 A1 | 1/2019 | Appel et al. |
| 2019/0044963 A1 | 2/2019 | Rajasekharan et al. |
| 2019/0215306 A1* | 7/2019 | Gopal ................ G06F 9/45558 |
| 2019/0251260 A1 | 8/2019 | Stockdale et al. |
| 2020/0244673 A1 | 7/2020 | Stockdale |
| 2020/0280575 A1 | 9/2020 | Dean et al. |
| 2021/0120027 A1 | 4/2021 | Dean et al. |
| 2021/0157919 A1 | 5/2021 | Stockdale et al. |
| 2021/0273958 A1 | 9/2021 | McLean |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

(56) References Cited

FOREIGN PATENT DOCUMENTS

| WO | 2019243579 A1 | 12/2019 |
| WO | 2020021100 A1 | 1/2020 |

OTHER PUBLICATIONS

Nikolystylfw, "Can Senseon beat Darktrace at its very own game with its 'An I triangulation' modern technology?" Dec. 22, 2018, nikolystylfw.

Lunden, Ingrid, "Senseon raises $6.4M to tackle cybersecurity threats with an AI 'triangulation' approach" Feb. 19, 2019, Tech Crunch.

Senseon Tech Ltd., "The State of Cyber Security SME Report 2019" Jun. 3, 2019, 16 pages.

Caithness, Neil, "Supervised/unsupervised cross-over method for autonomous anomaly classification," Oct. 25, 2019, CAMLIS 2019.

Senseon Tech Ltd., "Technology," * please see the statement filed herewith. https://www.senseon.io/tech accessed on Jul. 18, 2020.

Senseon Tech Ltd., "Senseon & You," * please see the statement filed herewith. https://www.senseon.io/senseon-and-you accessed on Jul. 18, 2020.

Senseon Tech Ltd., "Senseon Enterprise," * please see the statement filed herewith. https://www.senseon.io/enterprise accessed on Jul. 18, 2020.

Senseon Tech Ltd., "Senseon Pro," * please see the statement filed herewith. https://www.senseon.io/pro accessed on Jul. 18, 2020.

Senseon Tech Ltd., "Senseon Reflex," * please see the statement filed herewith. https://www.senseon.io/reflex accessed on Jul. 18, 2020.

International Search Authority, The International Search Report and Written Opinion of the International search Authority, 18 pages. (2021).

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom (2002).

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

Non-Final Office Action for U.S. Appl. No. 16/279,039 mailed Jun. 18, 2021, 22 pages.

Final Office Action for U.S. Appl. No. 16/279,039 mailed Jan. 24, 2022, 17 pages.

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.

European Patent Office, Supplementary European Search Report, Jun. 13, 2024, 9 pages.

* cited by examiner

ENDPOINT AGENT CLIENT SENSORS (cSENSORS) AND ASSOCIATED INFRASTRUCTURES FOR EXTENDING NETWORK VISIBILITY IN AN ARTIFICIAL INTELLIGENCE (AI) THREAT DEFENSE ENVIRONMENT

CROSS-REFERENCE

This application claims priority to and the benefit of under 35 USC 119 of U.S. provisional patent application titled "A cyber security system using artificial intelligence," filed May 18, 2020, Ser. No. 63/026,446, which is incorporated herein by reference in its entirety. In addition, this application claims priority to and the benefit as a continuation in part application under 35 USC 120 of U.S. non-provisional patent application titled "Endpoint agent and system," filed Feb. 19, 2019, Ser. No. 16/279,039, now U.S. Pat. No. 11,477,219, which claims priority to and the benefit of under 35 USC 119 of U.S. provisional patent application titled "A cyber threat defense system with various improvements," filed Feb. 20, 2018, Ser. No. 62/632,623, which is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the present disclosure generally relate to a cyber security and threat defense platform. More particularly, the embodiments relate to endpoint agent cSensors implemented to monitor network traffic, perform intelligent network functionalities, and extend network visibility for a cyber threat defense system.

BACKGROUND

In a cyber security environment, firewalls, endpoint security methods, and other detection and defense tools may be deployed to enforce specific policies and provide protection against certain threats on such an environment. These tools currently form an important part of an organization's cyber defense strategy, but they are insufficient in the new age of cyber threat. Similarly, these tools and strategies do not effectively protect against complex modern threats, such as employee 'insider' threats that are an ever-growing trend, as it is very difficult to spot malicious employees behaving inappropriately as they are integral to such an environment.

Moreover, due to the rise in smart, internet-connected devices and systems, the "digital estate" under the control or management of an enterprise has grown rapidly and created security blind-spots and artificial segregation of network visibility. Where previously it was sufficient to cover logical zones with cyber threat defense measures such as an office network, an email environment, and a production environment, enterprise networks increasingly contain additional independent systems like IoT devices or internet-connected smart systems such as vehicles or manufacturing equipment. These independent systems have uncommon protocol and data types for a traditional cyber protection system to analyze. Commercial cyber threat defense systems are restricted to logical enterprise zones by the specialization and focus of their machine learning approach, which is not versatile enough to accommodate unseen data types and structures without significant development work. The lower level protocols in a protocol stack also have widely varying data types that are different than those typically analyzed by most commercial third party cyber security protection systems; thus, making them unusual protocols to be analyzed by a traditional cyber protection system.

SUMMARY

In an embodiment, an endpoint agent client sensor (cSensor) for extending network visibility in an endpoint computing device is discussed.

In an embodiment, a security module can have an interface to cooperate with and integrate with an operating system (OS) of the endpoint computing device. A network module can cooperate with the security module. The network module can monitor network information coming into and out of the endpoint computing device as a first set of traffic data. The network module can ingest the first set of traffic data transmitted via one or more connections between a network interface of the endpoint computing device and at least one or more network entities. A collation module can collect the ingested first set of traffic data from the network module. The collation module can obtain input data from the collected first set of traffic data. The input data may include identifying a computing process running in the endpoint computing device that is the sender/receiver of the first set of traffic data. An analyzer module can have an intelligent deep packet inspection (DPI) engine. The analyzer module can receive the input data from the first set of traffic data being transmitted via the respective connection. The intelligent DPI engine can perform a first predetermined level of DPI on the input data from two or more possible levels of DPI based on one or more network parameters. A communication module can securely transmit a second set of traffic data to a cyber security appliance located in a network. The endpoint computing device also is part of the network. The transmitted second set of traffic data is associated with the first predetermined level of DPI performed on the input data from the first set of traffic data. The autonomous action module can perform one or more autonomous actions itself, rather than a human. The triggered autonomous action is correlated to at least one of i) the first set of traffic data and ii) the second set of traffic data received by cyber security appliance.

These and other features of the design provided herein can be better understood with reference to the drawings, description, and claims, all of which form the disclosure of this patent application.

BRIEF DESCRIPTION OF DRAWINGS

The above, and other, aspects, features, and advantages of several embodiments of the present disclosure will be more apparent from the following description as presented in conjunction with the following several figures of the drawings. The drawings refer to embodiments of the present disclosure in which.

Figure 1A:
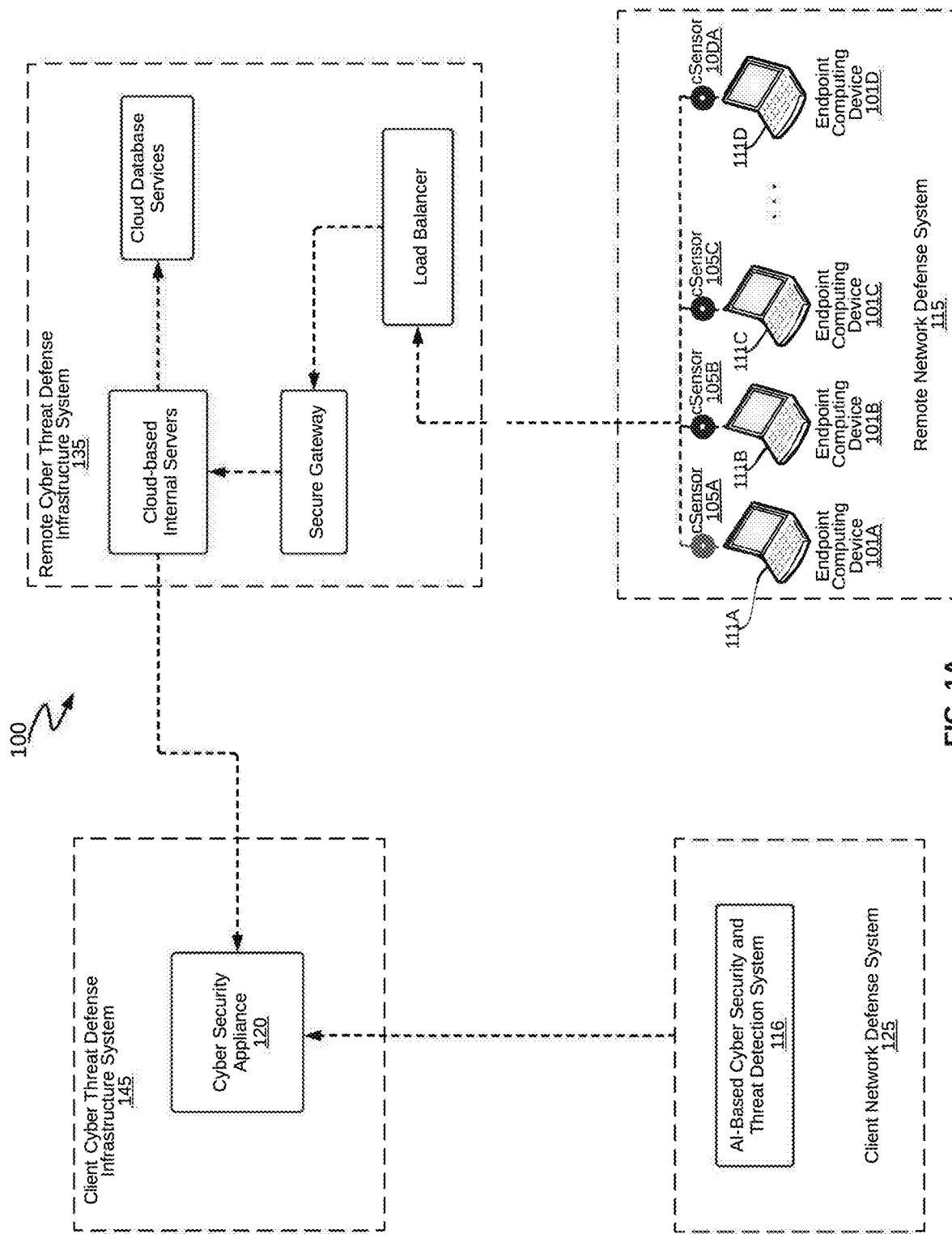
FIG. 1A illustrates an exemplary block diagram of a cyber threat detection system having a client network defense system, a remote network defense system, and one or more client/remote cyber threat infrastructure defense systems, which are configured to cooperate with each other to monitor network entities and extend visibility of those entities with a variety of endpoint agent sensors, in accordance with an embodiment of the disclosure.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design may be practiced without these specific details. In other instances, well known components or methods have not been described in detail but rather in a block diagram in order to avoid unnecessarily obscuring the present design. Further, specific numeric references such as a first server, may be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details may be varied from and still be contemplated to be within the spirit and scope of the present design. The term coupled is defined as meaning connected either directly to the component or indirectly to the component through another component.

In general, the embodiments described herein provide a cyber threat and detection platform having one or more cSensors configured to monitor network traffic, perform intelligent network functionalities, and extend network visibility for a cyber threat defense system. For example, in these embodiments depicted below, the cSensors may comprise a network module configured to monitor network information coming into and out of the endpoint computing device as a first set of traffic data. The network module can also cooperate with other network entities such as virtual sensors (e.g., vSensors, osSensors, etc.) to ingest a first set of traffic data from one or more network connections between any of the network entities. The cSensor may further include a collation module configured to collect the first set of traffic data and subsequently obtain input data associated with various observed events from the first set of traffic data. In an embodiment, the cSensor may include an analyzer module to receive the input data and to implement an intelligent DPI engine that may perform one or more predetermined levels of DPI from two or more possible levels of DPI on the input data based on various network parameters. The cSensor may further include a communication module configured to transmit a second set of traffic data to a cyber security appliance in the cyber threat defense system. The transmitted second set of traffic data is associated with the specified DPI performed on the input data. Lastly, as discussed in greater detail in the embodiments below, the cSensor may have an autonomous action module configured to thereby perform autonomous action(s) that are correlated to the first set of traffic data received by the endpoint device and/or the second set of traffic data received by the cyber security appliance. Note, the autonomous action can be directed and thus performed/triggered by the autonomous action module in the cSensor and/or by the cyber security appliance in the network.

Embodiments of the present disclosure generally relate to a cyber security and threat defense environment. More particularly, the embodiments relate to one or more cSensors implemented as endpoint agents to monitor network traffic, perform intelligent network functionalities, and extend network visibility in an AI-based cyber threat defense system. For example, by extending visibility to the disconnected endpoints, these cSensors may enable the system to cover branch offices and remote workers off the virtual private networks (VPNs) and/or the like. In addition, a light version of a cSensor can be employed in an IoT device. As such, the embodiments of these enhanced defense systems may now deploy lightweight cSensors as well as other sensors (e.g., vSensors, osSensors, etc.) on a range of managed endpoint devices. This, therefore, allows the systems to analyze real-time traffic of, for example, remote workers working on an endpoint device, in the same way it analyzes traffic in its network by correlating a web of connections to develop an evolving understanding of workforce behavior. Furthermore, these cSensors described herein provide much-needed visibility of suspicious activities occurring off the VPN, for example, from insider threats and compliance issues to latent strains of malware that could move laterally when employees reconnect.

Referring now to FIG. 1A, an exemplary block illustration of a cyber threat detection system 100 is shown, in accordance with an embodiment of the disclosure. In the illustrated embodiments, the cyber threat detection system 100 may include a client network defense system 125, a remote network defense system 115, a client cyber threat defense infrastructure system 145, and a remote cyber threat defense infrastructure system 135. As discussed above, the illustrated cyber threat detection system 100 may implement the network defense system 115 in conjunction with the remote cyber threat defense infrastructure system 135 to cooperate with a cyber security appliance 120 in the client cyber threat defense infrastructure system 145 in order to monitor various network entities and extend visibility of such entities via a series of endpoint agents 111A-D and sensors 105A-D residing on endpoint computing devices 101A-D.

The cyber security client resident sensor (or cSensors 105A-D) and associated architecture can be configured to monitor traffic and perform intelligent functions on that traffic prior to the traffic and/or its metadata being passed onto a cyber security appliance. The illustrated cSensors 105A-D extend the visibility of the cyber security appliance located in the network via the implemented endpoint agents 111A-D that monitors devices' network activity and delivers key data and metadata to the cyber security appliance 120. This can include remote working devices and those generally that cannot be seen adequately using bulk network traffic mirroring or other less-effective probes or sensors. These cSensors 105A-D may be ideally used in combination with other virtual sensors and deployment options to achieve a combination of greater and simpler visibility into IoT devices as well as remote workers working off line from the company network. The cSensors may also increase the amount of device identity data available in the client network system 125 and can aid device tracking in their respective user interfaces. For example, a security module of the cSensor 105A-D can have an interface to cooperate with and integrate with an operating system (OS) of the endpoint computing device. A collation module of the cSensor 105A-D can cooperate with the security module to obtain input data from the collected first set of traffic data. The additional collected information can include, for example, an identity of a computing process running in the endpoint computing device that is sending the first set of traffic data and/or receiving the first set of traffic data. As described above, the cSensors 105A-D may be an end point agent that does packet ingestion and autonomous actions on the packets being analyzed. The cSensor is an agent installed on a client device which ingests network traffic passing to and from that device and performs some processing on that network traffic before sending it on (in packet or metadata form) as a second set of traffic data to a cyber security appliance located in a network. The network traffic can include, for example, packets from browsing, a Remote Desktop connection (RDP), encrypted SSH packets, etc. There are many variations on this process. The client sensor can ingest network traffic from any of these sources because it is resident within the endpoint device and perform deep packet inspection (DPI) on the traffic (1) to derive metadata and pass on only the metadata (i.e., "Full DPI") (e.g., HTTP traffic); (2) the client sensor can perform DPI on just parts of the connection and pass that metadata onward ("Partial DPI") (e.g., HTTPS traffic); or (3) the client sensor can process and forward all traffic to the secondary location ("No DPI") (e.g., kerberos traffic) simple mirroring of information. Which option of these three DPI actions to take for the level of DPI applied to each connection by the cSensor 105A-D is dependent on the network parameters. The network parameters to determine what predetermined level of DPI from the two or more possible levels of DPI to perform on the input data can include one or more of (i) a particular protocol being used by the first set of traffic data received or sent by the endpoint device, (ii) a proximity distance between a geographic location of the cSensor and a geographic location of the cyber security appliance, (iii) a particular size of the traffic data under analysis, and (iv) a particular degree of 'interestingness' for the traffic data under analysis in relation to the respective connection. Thus, the cSensors 105A-D may be configured to intelligently chose to pass on i) just the metadata associated with the packet traffic, ii) just a subset of the packets (e.g., packets of potential interest) and the meta data, and/or iii) pass along all of the packets to the central cyber security appliance 120 at a separate location from the cSensors 105A-D by factoring in one or more of these factors. Typically, the cSensors 105A-D factors in all four network parameters to determine what predetermined level of DPI from the two or more possible levels of DPI to perform on the input data.

In an embodiment, a secondary location may be: a) a cyber security virtual sensor (sensor) that captures VM traffic in a virtualized environment 135 located locally to the cSensors 105A-D (in the same private network or subnet) (the sensor then communicates directly with the cyber security appliance 120), b) a cloud-based secure gateway service which routes the forwarded data to the cyber security appliance 120, and/or c) an on-premises secure gateway service running on or beside a cyber security sensor. The cSensors and/or gateway service may also communicate with a third-party server managing third-party agents to receive process and traffic information ingested by the third-party agent. In one scenario, a cSensor may perform the DPI on forwarded traffic from one or more other client sensors to derive metadata which is then sent to the central cyber security appliance. This scenario may be preferable to prevent traffic passing over the network for security and bandwidth reasons. In another scenario, the cSensors and/or secure gateway service may route the forwarded metadata or connections through to the central cyber security appliance, meaning that the client does not need to create firewall exceptions for the client devices/endpoint devices hosting the endpoint agent cSensor. The gateway service may be a virtual machine, containerized service, etc. In an additional scenario, the gateway service or the V-machine can securely pass on forwarded traffic or forwarded meta data onto the central cyber security appliance and does not need to create additional firewall exceptions.

Lastly, the cSensor 105A-D may also be configured to perform autonomous actions, such as stopping certain traffic (and any other desirable actions based on the client needs, network infrastructures, and such), in response to instructions from the connected services (e.g., the sensor, the centralized master appliance 120 via the secure gateway service). The cSensors 105A-D may be implemented as the respective endpoint agents 101A-D that does packet ingestion and autonomous actions on the packets being analyzed.

Similarly, as described above, in FIG. 1B, the endpoint agent 111A with regard to the discussion of FIG. 1B depicts the one or more modules utilized by the endpoint agent cSenors 105A-D. In an embodiment, the endpoint agent cSensor 111A may comprise a network module configured to monitor network information coming in and going out to one or more network entities. The network module is configured to cooperate with one or more sensors to ingest a first set of traffic data transmitted via one or more connections between the network interface of the endpoint computing device and at least one or more of the network entities and sensors. A security module can have an interface to cooperate with and integrate with an operating system (OS) of the endpoint computing device. A collation module is configured to collect the ingested first set of traffic data from the network module. The collation module can obtain input data from the collected first set of traffic data. The obtained input data can include a variety of observed network events implemented by the respective network entities as well as identities of a computer process running (e.g. executable files resident) in the endpoint receiving and sending the first set of traffic currently under analysis.

An analyzer module having an intelligent DPI engine, the analyzer module configured to receive the input data from the first set of traffic data being transmitted via the respective connection. The intelligent DPI engine is configured to perform one or more predetermined levels of DPI from its two or more possible levels of DPI on the input data based on one or more network parameters. A communication module is configured to transmit a second set of traffic data to a cyber security appliance in the network. The transmitted second set of traffic data is associated with the specified DPI performed on the input data from the first set of traffic data (e.g. DPI on all or some of the meta data and/or simple mirroring—no DPI). An autonomous action module is configured to perform one or more autonomous actions. In an embodiment, the autonomous action is in response to an autonomous response triggered by the cyber security appliance. For example, in an embodiment, the cSensor is installed on an IoT device with a limited amount of computing power. The triggered autonomous action may come from the cyber security appliance in the network which has enough processing power to recognize a potential cyber threat and a correct autonomous response to take and send the response to the cSensor resident in the IoT device. The autonomous action can be correlated to the first set of traffic data received by the endpoint device and/or the second set of traffic data received by the cyber security appliance.

In an embodiment, these predetermined levels of DPI may include a full DPI, a partial DPI, and/or a non-DPI, such that: (i) the full DPI is configured to process all packets in the first set of traffic data in order to derive all metadata associated with that first set of traffic data; (ii) the partial DPI is configured to process a portion of the packets in the first set of traffic data in order to derive a portion of the metadata associated with that first set of traffic data; and/or (iii) the non-DPI is configured to not process any of the packets in the first set of traffic data in order not to derive any of the metadata associated with that first set of traffic data but rather perform simple mirroring of incoming information from the network interface into the endpoint computing device and/or information going out from the endpoint computing device. In an embodiment, the transmitted second set of traffic data may be particularly configured to include: (i) only all of the derived metadata from the full DPI, (ii) the portion of the derived metadata in conjunction with the remaining portions of the packets from the partial DPI, and/or (iii) only all of the packets from the non-DPI.

The autonomous actions comprise at least one or more of blocking a particular connection, blocking a particular type of traffic data, preventing a particular type of activity, cooperating with the operating system to shut down one or more computer processes running on the endpoint computing device, and other similar network preventative actions. Note, the network entities can include one or more of network infrastructures, network devices, and devices/accounts associated with a specific user in one or more networks. In an embodiment, the one or more sensors comprise at least one or more of virtual sensors (vSensors), operating system sensors for a cloud environment (osSensors), security modules, and/or probes.

The network parameters can include at least one or more of: (i) a particular protocol being used by the first set of traffic data, (ii) a proximity distance between a geographic location of the cSensor and a geographic location of the cyber security appliance, (iii) a particular size of the traffic data under analysis, and (iv) a particular degree of interest for the traffic data under analysis in relation to the respective connection.

The collation module can collect network activity data from the network entities and to cooperate with a coordinator module to correlate one or more causal links between the collected network activity data from the network entities. For example, the collation module may be configured to: (i) perform passive ingestion of input data, (ii) perform potentially active collection of input data, (iii) collate connection content for any other modules in the endpoint agent cSensor and/or any other modules in any other sensors, and/or (iv) understand a plurality of characteristics of a connection event.

A security module is configured to have an interface, such as an API, driver, etc. to cooperate with and integrate with an operating system (OS) of the endpoint computing device. The security module can cooperate with the network module to assist the linking of network information with executable files/computing processes in the endpoint client device. A multi-cloud computing services modules can monitor and collect data from one or more of a Software as a Service (Saas), an Infrastructure as a Service (IaaS), a Platform as a Service (PaaS), and/or a hybrid service. A collection module cooperating with the security module can monitor and collect specified data from multiple computing software processes executing on this endpoint device. For example, the collections and communication modules may cooperate with each other to transmit any of the observed activities to the cyber security appliance based on the specified data monitored and collected from the endpoint agent cSensor. The types of transmitted activities include at least one or more of network connection activities, data transfer activities, and/or behavior pattern activities.

A cyber threat module is configured to detect potentially unusual network activity in order to provide an additional input of information in conjunction with the transmitted specified data. For example, the cyber threat module is configured to generate a score or probability score corresponding to a level of detected potential cyber threat. Thus, the cyber threat module generates a score or probability corresponding to a level of how harmful a detected potential cyber threat is maliciously harmful to the endpoint computing device. In some endpoint devices that have a lot of memory and processing power, the endpoint agent cSensor 111A may have one or more machine learning models cooperating with the rest of the modules, such that these machine learning models are trained on a normal pattern of life of various network, behavior, and/or data activities within the network. When the memory and processing power is not available in an endpoint device, then the cyber security application can house and run the machine learning models.

Figure 1B:
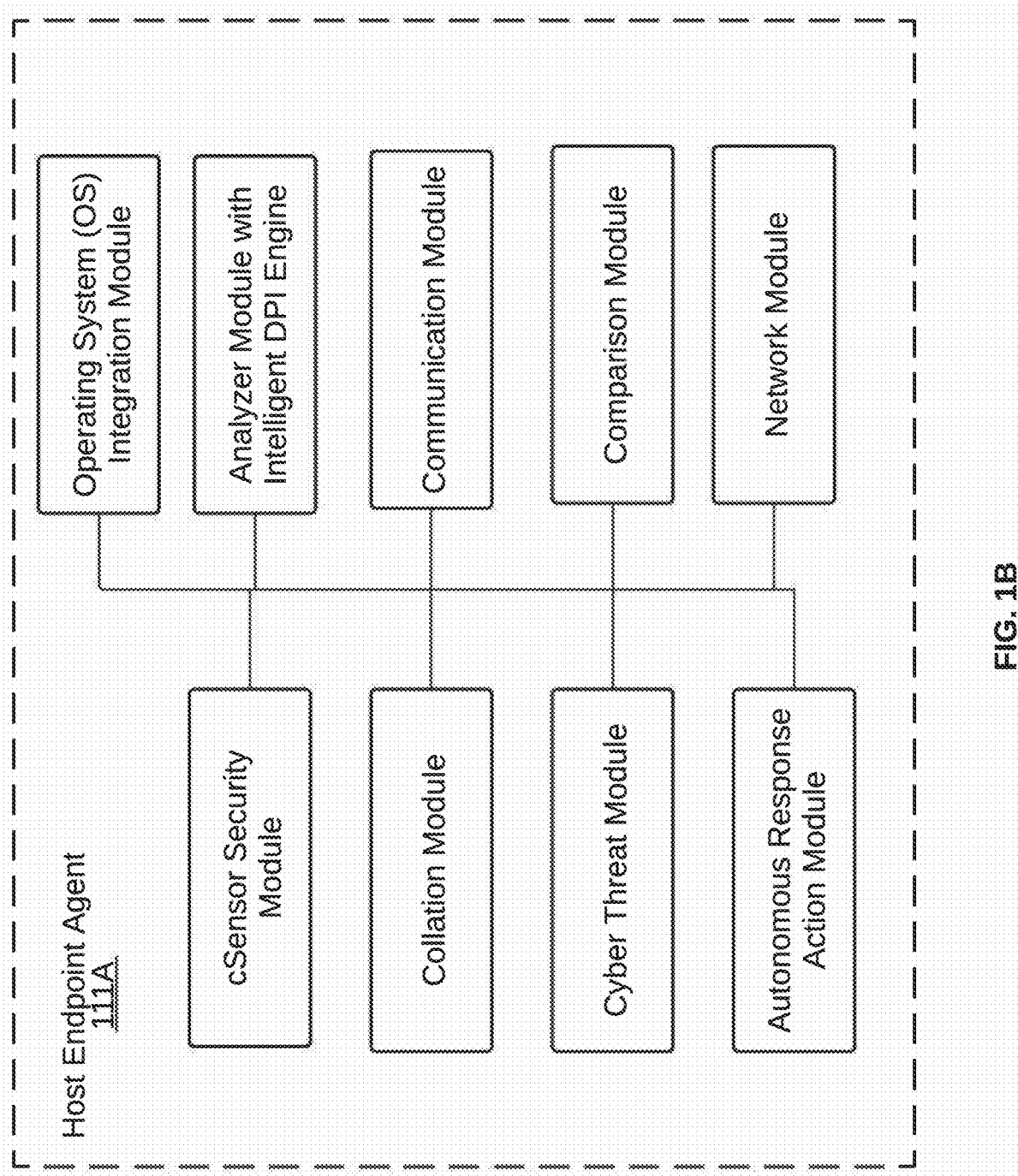
FIG. 1B illustrates an exemplary block diagram of an endpoint agent sensor with regard to the disclosure depicted above in FIG. 1A, in accordance with an embodiment of the disclosure.

Note that any instructions of any of the modules of the endpoint agents 111A-D and cSensors 105A-D shown in FIGS. 1A-B may be scripted to be stored in an executable format in one or more memories and implemented by one or more processors of the respective endpoint computing devices.

Figure 2:
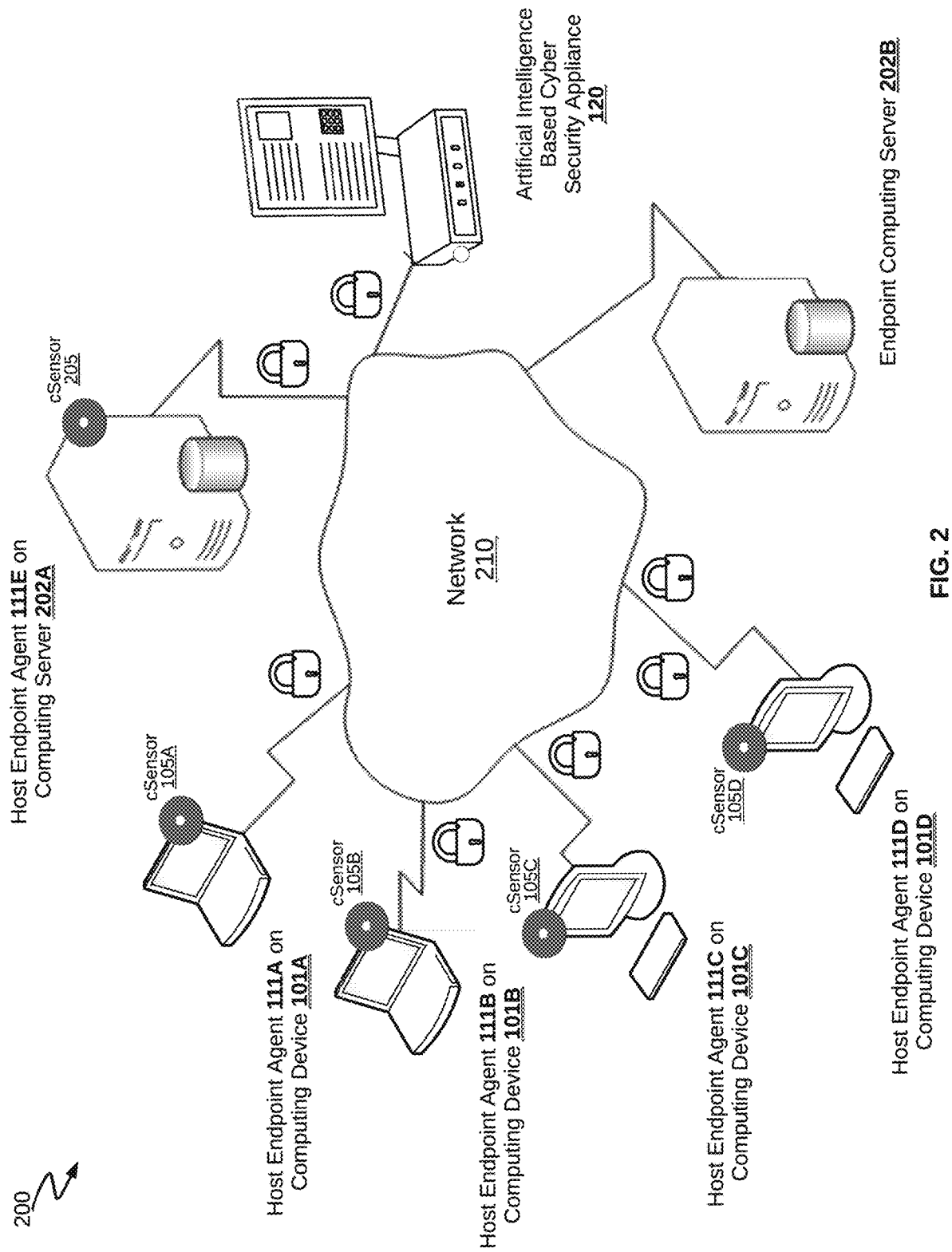
FIG. 2 illustrates an exemplary block diagram of a cyber security system having a cyber security appliance cooperating with a plurality of endpoint agent and sensors residing on a plurality of endpoint computing devices, which are communicatively coupled to each other over a network, in accordance with an embodiment of the disclosure.

Referring now to FIG. 2, the AI-based cyber threat security system 200 has a cyber security appliance 120 communicatively coupled with the host endpoint agents 111A-E, endpoint agent cSensors 105A-D, endpoint computing devices 101A-D, and computing servers 202A-B over a network 210. The AI based cyber security system 200 may use the cyber security appliance 120 depicted in FIG. 2 to cooperate with the host endpoint agents 111A-E and endpoint agent cSensors 105A-D on their respective endpoint computing devices 101A-D and server 102A via the secure communication channels established with the network 110. The AI based cyber threat security system 200 depicted in FIG. 2 may be substantially similar to the cyber threat security system 100 depicted in FIG. 1A.

The cyber security appliance 120 can cooperate with the endpoint agent cSensors 105A-D residing on their respective endpoint computing devices 101A-D and server 202A to communicate, for example, receive any collected pattern of life data.

In some embodiments, the network 210 may be: (i) an information technology network, (ii) an operational technology network, (iii) a cloud infrastructure, (iv) a SaaS infrastructure, and/or (v) any combination thereof capable of being communicatively coupled to each of the respective endpoint computing devices and servers 101A-D and 202A-B. The network 210 may be used to communicatively couple the endpoint computing devices 101A-D to the endpoint computing servers 202A-B and the cyber security appliance 120. Furthermore, as shown in FIG. 2, the endpoint computing server 202A may be communicatively coupled to the network 110 via a secure channel, such as through port 443. Note, the endpoint computing server 202A with cSensor 205 can be similar to the endpoint computing server 202B, with the exception that the endpoint computing server 202B is not capable of receiving secured data from any of the other endpoint computing devices 101A-D, server 202A, and/or cyber security appliance 120 that have a cSensor.

In some embodiments, the endpoint agent cSensors 105A-D are configured to: (i) have a low system impact on the end-point computing-device and run without degrading the endpoint computing-device performance significantly; (ii) monitor the "pattern of life" of the end-point computing-device, its processes, such as Outlook, Word, etc., its users, events on that device, etc. This at least includes: (a) process behavior (use of network, filesystem, etc.), (b) relationships between processes (parent/child, shared files, IPC), and (c) user behavior (applications commonly used, IT habits); (iii) make reports on pattern of life metadata, events and alerts to an API whenever connected to the internet or LAN, and while offline, cache data to deliver when possible; (iv) assist in performing IT audits while also completing pattern of life data and events (e.g., the following list is illustrative and should not be considered exhaustive: (a) audit system details, for example installed operating systems, installed software, software versioning, security update status; (b) gather system usage activity such as shutdown periods, login failures, file modifications, network connections, etc.; and (c) record use of external devices or transfer protocols (e.g., USB usage, Bluetooth usage, email usage, etc.); and (v) autonomously react to anomalies in pattern of life: (a) cooperate with the appliance 120 with its significantly greater processing power, sets of models including, for example, pulling when available, any actions to be taken and/or be able to take a limited set of actions when a connection to the cyber defense appliance 200 is not available; (b) provide an operator with the ability to enable the end point agent to perform a select number of relatively simple actions when predefined conditions of suspicious behavior and/or anomaly level are met, independent of the cyber defense appliance; and (c) example actions may include, but are not limited to, prompt user, quarantine a suspicious process (from network access and process as well as internal computing device's process and filesystem), shutdown the offending processes, and others.

As described above, each host endpoint agent 111A-E may include an endpoint agent cSensor 105A-E configured to extend visibility and monitor network entities on their respective endpoint device/server 101A-D/202A.

Each cSensor cooperating with a host endpoint agents 101A-D on a same device may use the collections module to cooperate with two or more other sensors (or probes) that include, but are not limited to, at least: (i) a first type of probes specifically configured to collect data from an operating system of its respective endpoint computing devices/server 101A-D/202A; (ii) a second type of probes specifically configured to collect data from each individual process executing on that endpoint computing devices/server 101A-D/202A; and (iii) a third type of probe configured to collect system event and logging data from that endpoint computing devices/server 101A-D/202A. The collections module may cooperate with one or more of the third type of probes to monitor and record events occurring on those endpoint computing devices/server 101A-D/202A. The collected data from the operating system and individual processes along with the recorded events may be sent in the collected pattern of life data by the collections modules to the appliance 120.

The collections module's framework runs probes in communication with the other various modules and data stores. The first type of probes may monitor the operating system to gather profiling pattern of life data about the system state. This information may include, for example, installed applications, software versions, operating system and pending security updates. Meanwhile, the second type of probes may monitor individual processes themselves to gather process pattern of life data such as, but not limited to, associations between parent and child processes, network connectivity and process interaction, file system interaction, etc. Lastly, the third type of probe may detect and record events and collaborate with default system event logging tools. This probe may gather events such as, for example, connections to new Wi-Fi or wired networks, interaction with peripheral devices (including, but not limited to, universal serial bus, visual displays, etc.) and system usage events such as power management, file modification, etc.

As discussed, one or more models may be a self-learning model trained on a normal behavior of each of the entities in an endpoint device and/or each network entity. The self-learning model of normal behavior is then continuously updated with the actual behavior of that entity. The self-learning model of normal behavior is updated when new input data is received that is deemed within the limits of normal behavior. The modules may compare the analyzed metrics received from the probes and hooks to a moving benchmark of parameters that correspond to the normal pattern of life for the computing system used by the self-learning model. Accordingly, the cyber threat module may then determine, in accordance with the analyzed metrics and the moving benchmark used by the self-learning model of normal behavior of the entity, an anomaly score indicative of a likelihood of a harmful cyber threat and its severity.

Note, a normal behavior threshold may be used by the models as a moving benchmark of parameters that correspond to a normal pattern of life for the entities. The normal behavior threshold is varied according to the updated changes in the computer system allowing the model to spot behavior on the computing system that falls outside the parameters set by the moving benchmark.

Again, as described above, any of the host endpoint agents 111A-E cooperating with a cSensor 105A-E may have an autonomous action module that causes one or more autonomous actions to be taken to contain the cyber threat when detected and when: (i) that endpoint agent is not connected to the network 210 where the appliance 120 is installed, (ii) the appliance 120 is unavailable to communicate with the endpoint agent, and/or (iii) any combination of (i) and/or (ii) occur. The autonomous action module located in that endpoint agent may take one or more autonomous action actions preapproved by a human user when predefined conditions of suspicious behavior and/or anomaly level are met, independent of the appliance 120 to autonomously attempt to contain the potential cyber threat.

Again, the autonomous action module, rather than a human taking an action, may be configured to cause one or more autonomous actions to be taken to contain the cyber threat when a potential cyber threat is detected. Note, the cyber security appliance 120 may have the autonomous action module, and/or one or more portions of the autonomous action module may exist on that host endpoint agent and/or cSensor, while the majority portion may remain on the cyber security appliance 120 due to greater processing power. A user programmable interface hosted on the appliance 120 may have, any of, fields, menus, and icons that are configured to allow a user to preauthorize the autonomous action module to take actions to contain and/or respond to the cyber threat. The user programmable fields/menus/icons for allowing preauthorization may include, but are not limited to, killing individual processes, revoking specific privileges, preventing the download of specific files, allowing only processes observed in the pattern of life for peer devices to be active for a set period, and asking other EPPs to quarantine suspicious files, etc., while not disturbing operations of other processes going on inside that device.

The user programmable interface has the granularity in options available to the user to program the autonomous action module to take very specific actions such as killing individual processes, revoking specific privileges while still permitting other permissions for that user, getting live terminal access, preventing the download of specific files, allowing only processes observed in the pattern of life for peer devices to be active for a set period, asking other EPPs to quarantine suspicious files, etc. while not shutting down an entire device, or blocking all outside communications, or revoking one or more but not all of that user's privileges. Actions such as revoking only some user privileges or enforcing the peer pattern of life allow the user to continue working but just not perform certain connections or run certain processes, which most likely a malicious piece of software was initiating, such as accessing and downloading sensitive files while the user, completely unaware of the malicious software using their credentials, is doing a normal activity for that user such as typing out a document or entering data into a program.

Figure 3:
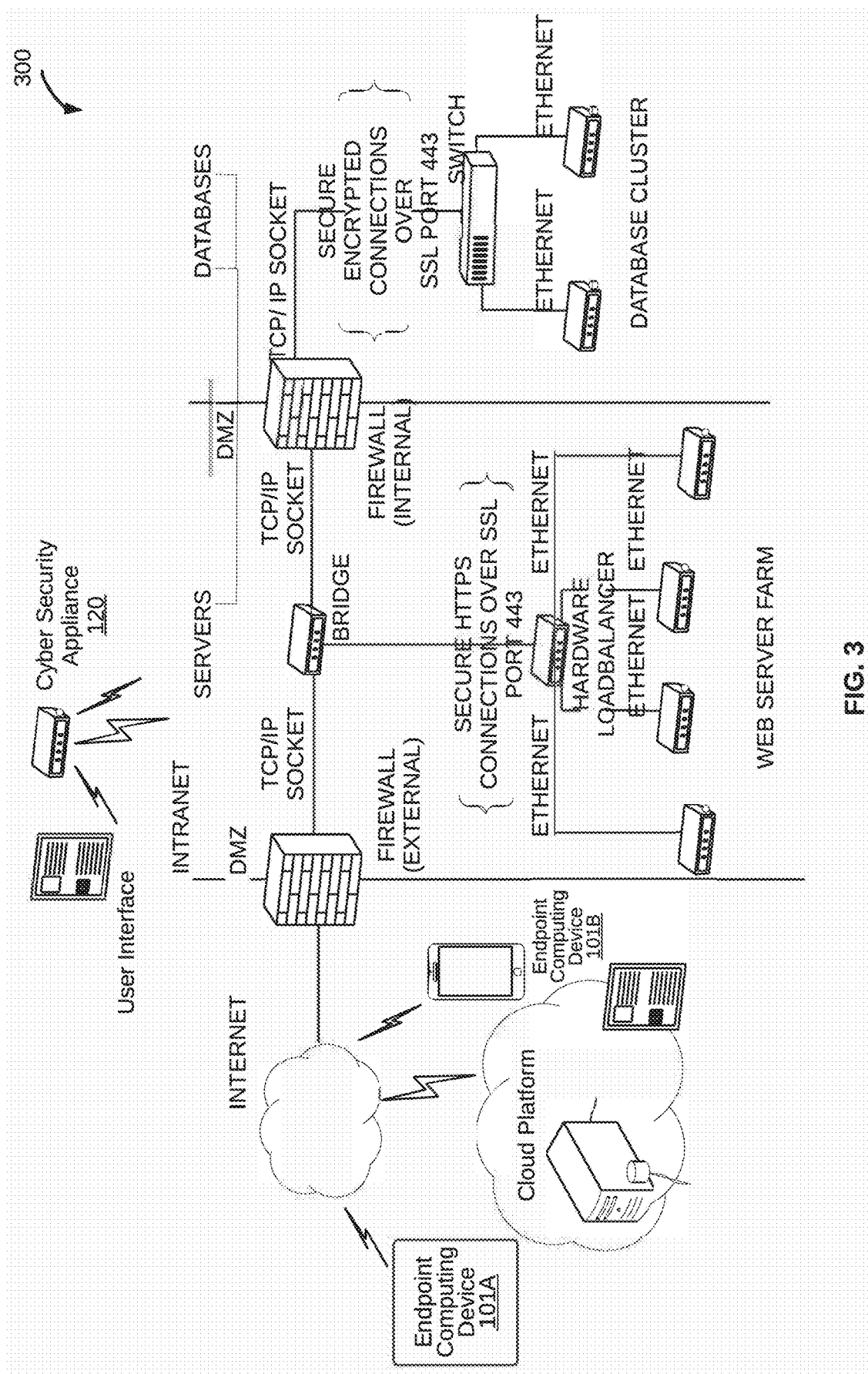
FIG. 3 illustrates a block diagram of an exemplary cyber security platform having a cyber security appliance configured to protect various network devices and endpoint devices communicatively coupled over a network, in accordance with an embodiment of the disclosure.

Referring now to FIG. 3, an AI based cyber security network environment 300 can have a cyber security appliance 120 configured to protect endpoint devices 101A-B and a variety of network devices. As shown in FIG. 3, the AI based cyber security network environment 300 may use the cyber security appliance 120 to cooperate with the host endpoint devices 101A-B and, for example, their respective endpoint agent cSensors in conjunction with the other network devices to communicate with each other in this network environment 300. The AI based cyber security network system 300 depicted in FIG. 3 may be configured similar to the cyber threat security systems 100 and 200 depicted in FIGS. 1A and 2.

Figure 4:
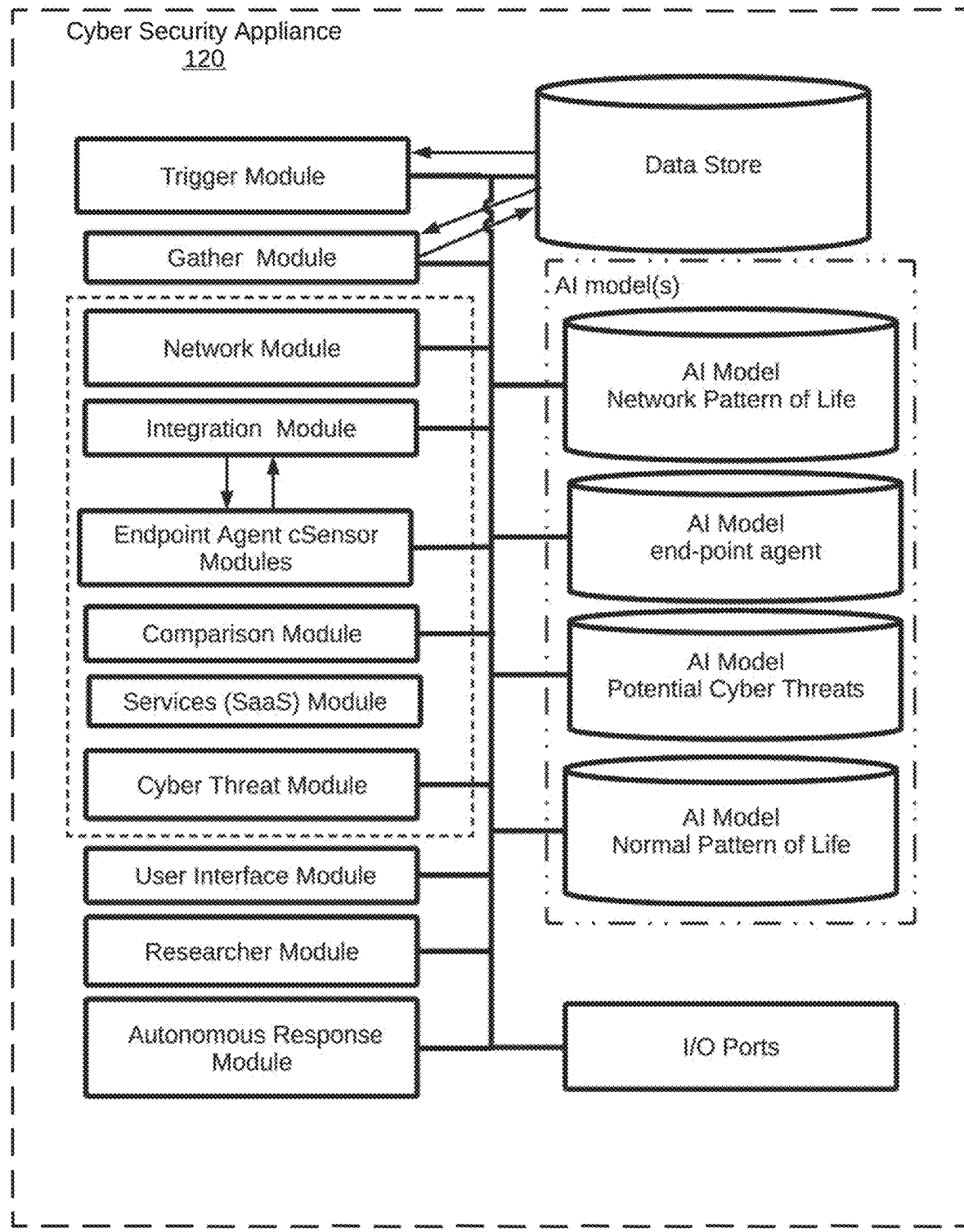
FIG. 4 illustrates a block diagram of a cyber security appliance with various modules cooperating with one or more machine learning models trained on the discrete pattern of life of various types of network events of network entities observed by various endpoint agent sensors, in accordance with an embodiment of the disclosure.

Referring now to FIG. 4, an exemplary block illustration of a cyber security appliance 120 is shown, in accordance with an embodiment of the disclosure. In the illustrated embodiments, the cyber security appliance 120 may be substantially similar to the cyber security appliance 120 depicted above in FIGS. 1A and 2-3. Furthermore, as shown in FIG. 4, the illustrated embodiments of the cyber security appliance with an endpoint agent cSensor as well as a cyber threat module that references machine-learning models that are trained on the normal behavior of network activity and user activity associated with a network. The cyber threat module determines a threat risk parameter that factors in 'what is a likelihood of a chain of one or more unusual behaviors of email activity, network activity, and user activity under analysis that fall outside of being a normal benign behavior;' and thus, are likely malicious behavior.

The cyber security appliance 120 may protect against cyber security threats from an e-mail system or other communication system, as well as its network. The cyber security appliance 120 may include components such as i) a trigger module, ii) a gather module, iii) a data store, iv) a collation module, v) a coordinator module, vi) a comparison module, vii) a cyber threat module, viii) a researcher module, ix) a host module (e.g., host-based endpoint agent cSensors), x) a scoring module, xi) a user interface module, xii) an autonomous action module, xiii) a communication module, xiv) at least one input or output (I/O) port to securely connect to other ports as required, xv) one or more machine-learning models such as a first Artificial Intelligence model trained on characteristics of vectors for malicious activity and related data, a second Artificial Intelligence model trained on the characteristics of external hosts and the interaction of network entities with external hosts, a third Artificial Intelligence model trained on potential cyber threats, and one or more Artificial Intelligence models each trained on different users, devices, system activities and interactions between entities in the system, and other aspects of the system, as well as xvi) other similar components in the cyber threat defense system.

The AI model of the normal pattern of life for the independent system can use unsupervised machine learning algorithms and feedback on the data and/or the meta data from the protocols and data types in the various layers to routinely update the AI model of the normal pattern of life during an operation of the independent system. The core processing is versatile and does not require tailored algorithms to each platform to produce anomaly detection outputs.

An AI model can be trained to model the normal pattern of life for the independent system from the data and/or the meta data from the protocols and data types in any of i) a data link layer, ii) a physical layer, or iii) both; and then, one or more of the following network stack layers when that layer is utilized in the independent system. The following network stack layers can include any of iv) an application layer, v) a transport layer, vi) a network layer, and vii) any combination of these three layers when that layer is utilized in the independent system. The AI model of the normal pattern of life for the independent system can use unsupervised machine learning algorithms and feedback on the data and/or the meta data from protocols and data types in the network stack layers utilized in that independent system to routinely update the AI model of the normal pattern of life of the independent system, during an operation of the independent system.

The cyber-defense appliance securely communicates and cooperates with a suite of different endpoint agent cSensors that can ingest onboard traffic from multiple different independent systems using protocols for at least one of a data link layer, a physical layer, and then one or more of an application layer, a transport layer, a network layer, and any combination of these layers when a protocol is used in that layer in the independent system. The centralized cyber security appliance 120 can securely communicate and cooperate with a suite of two or more different endpoint agent cSensors that have 1) one or more protocol analyzers, 2) an address and mapping to an interface with a third party protocol analyzer, 3) an address and mapping to a different interface for the cyber security appliance 120.

As described above, one or more endpoint agent cSensors may be integrated within an independent system to extend monitoring and gathering of data capability of the cyber security appliance 120. The endpoint agent cSensor provides at least remote monitoring and gathering on 1) data, 2) meta data, and 3) a combination of both, from one or more protocols and data types utilized in any of i) a data link layer, ii) a physical layer, or iii) both; and then, one or more of the following network stack layers when that layer is utilized in the independent system. The endpoint agent cSensor may be implemented external to the main system and receive system information as metadata from a third-party sensor or processor, perform a limited amount of onboard analysis or protocol parsing to retrieve the desired network-layer data, and is sensitive to the specifics of independent systems of this nature (such as, but not limited to, bandwidth limitations, power availability and intermittent network access).

The endpoint agent cSensors are part of a suite of two or more different endpoint agent cSensors (e.g., as shown with the cSensors 105A-D in FIG. 1A). Each endpoint agent cSensor can have one or more protocol analyzers for monitoring and gathering of 1) data, 2) meta data and 3) a combination of both, analyzer for monitoring and gathering of 1) data, 2) meta data and 3) a combination of both, from a first protocol and data types in the data link layer in the independent system including protocol types and data types which are encapsulated by previously unfamiliar physical layer and/or data link layer protocols to the system. For example, a first endpoint agent cSensor has a first protocol analyzer for monitoring and gathering of 1) data, 2) meta data and 3) a combination of both, from a first protocol and data types in the data link layer in the independent system. The first protocol in the data link layer can be, for example, Address Resolution Protocol, Neighbor Discovery Protocol, Open Shortest Path First, Tunnels L2TP, Point-to-Point Protocol, Medium access control protocol, Logical link control (LLC), ISDN, FDDI, etc.

Another endpoint agent cSensor can have a second protocol analyzer for monitoring and gathering of 1) data, 2) meta data and 3) a combination of both, from a second protocol and data types in the physical layer in a second independent system. Some example protocols in the physical layer can be, for example, Digital Subscriber Line, UTP, RS-232, Plesiochronous Digital Hierarchy, Synchronous Digital Hierarchy, Synchronous Optical Networking, Passive Optical Network, OTN, numerous 802 IEEE standards, Universal Serial Bus, Bluetooth, RS-449, etc.

The endpoint agent cSensors ingest onboard traffic from any of sensors and other components within the independent system they integrate in, in order to communicate their data and/or meta data to the cyber security appliance 120. The endpoint agent cSensors ingest onboard traffic from any of the sensors and the other components within the independent system in order to derive the data and/or meta data from the one or more protocols and data types to be sent on to cyber security appliance 120. The data can be routed for the express purpose of sending to the centralized appliance, and/or the data can be produced for a different purpose but then the cyber security appliance can be sent a copy of that data for its own analysis.

The cyber security appliance 120 securely communicates and cooperates with the suite of two or more different endpoint agent cSensors that have 1) one or more protocol analyzers, 2) an address and mapping to an interface with a third party protocol analyzer, 3) an address and mapping to an interface with the cyber security appliance 120. The probes can ingest onboard traffic from a plurality of different independent systems, such as i) Internet of Things (IoT) devices, ii) autonomous driving vehicles, iii) ships, iv) airplanes, v) etc., using protocols in 1) an application layer, 2) a transport layer, or 3) a network layer encapsulated in an unfamiliar data link layer, or physical layer.

The cyber security appliance 120 has one or more AI models configured to model a normal pattern of life in each of the independent systems using 1) data, 2) meta data and 3) a combination of both, from protocols for at least 1) the network layer and/or 2) the transport layer for data encapsulated by physical and datalink layer protocols specific to the independent system. The AI model can model the normal pattern of life for 1) data, 2) meta data and 3) a combination of both, from one or more protocols and data types utilized in any of i) a data link layer, ii) a physical layer, or iii) both; as well as, 1) data, 2) meta data, and 3) a combination of both, from protocols in any of iv) an application layer, v) a transport layer, vi) a network layer, and vii) any combination of these three layers when a protocol is used in that layer in the independent systems. Thus, one or more artificial intelligence models trained to model the normal pattern of life for 1) data, 2) meta data, and 3) a combination of both, from the unusual protocols and data types being analyzed in these independent systems. The endpoint agent cSensors integrated into the independent systems may have one or more protocol analyzers to analyze the activity in the protocols and data types used in any of i) a data link layer, ii) a physical layer, iii) an application layer, iv) a transport layer, v) a network layer, and vi) any combination of these layers when a protocol is used in that layer in the independent system. The data points can be securely conveyed back to the cyber security appliance 120 which has generally AI models trained, for each independent system, to model a normal pattern of life using 1) data, 2) meta data, and 3) a combination of both in the protocols and data types used in at least the physical layer and/or protocols and data types used in the data link layer.

The analyzer module cooperates with the one or more AI models trained to model a normal pattern of life in each of the independent systems to determine when any of i) an abnormal behavior, ii) a suspicious activity, and iii) any combination of both is detected in that independent system, which at least uses the protocols in at least one of 1) the data link layer and 2) the physical layer. Each AI model can be trained to model the normal pattern of life of a given independent system, such as an IoT device's pattern of life, which uses the 1) data, 2) meta data, and 3) a combination of both in the protocols of at least 1) the data link layer and 2) the physical layer.

The trigger module may cooperate with one or more AI models trained with machine learning on a normal pattern of life in the system, at least one of i) an abnormal behavior, ii) a suspicious activity, and iii) any combination of both, from one or more entities in the system. Upon detecting the i) abnormal behavior, ii) a suspicious activity, and iii) any combination of both. The trigger module cooperates with the analyzer module on what additional types of data points are needed to support or refute a given cyber threat and then cooperate with the data gather module to obtain that data.

The cyber security appliance 120 may have a cyber threat analyst module. The cyber security appliance 120 may use i) one or more AI models to form and investigate hypotheses, ii) a set of scripts to form and investigate hypotheses, and iii) any combination of both, in order to form and investigate hypotheses on what are a possible set of cyber threats. The cyber threat analyst module to form and investigate hypotheses on what are a possible set of cyber threats can use any of i) the one or more AI models to form and investigate hypotheses trained with supervised machine learning on human-led cyber threat investigations and then steps, data, metrics, and meta data on how to support or to refute the hypotheses on what are a possible set of cyber threats, ii) the set of scripts to form and investigate hypotheses to aid in how to form the hypotheses on what are a possible set of cyber threats and then the steps, data, metrics, and meta data to collect additional system data points to support or to refute the possible cyber threat hypotheses, and iii) any combination of both.

The cyber threat analyst module to form and investigate hypotheses on what are a possible set of cyber threats cooperates with the analyzer module to conduct an investigation on a possible set of cyber threats hypotheses that would include the at least one of i) the abnormal behavior, ii) the suspicious activity, and iii) any combination of both, identified through cooperation with the one or more AI models trained with machine learning on the normal pattern of life in the system.

Furthermore, as described above, the trigger module may detect time stamped data indicating one or more i) events and/or ii) alerts from I) unusual or II) suspicious behavior/activity are occurring and then triggers that something unusual is happening. Accordingly, the gather module is triggered by specific events and/or alerts of i) an abnormal behavior, ii) a suspicious activity, and iii) any combination of both. The inline data may be gathered on the deployment from a data store when the traffic is observed. The scope and wide variation of data available in this location results in good quality data for analysis. The collected data is passed to the comparison module and the cyber threat module.

The gather module may comprise of multiple automatic data gatherers that each look at different aspects of the data depending on the particular hypothesis formed for the analyzed event and/or alert. The data relevant to each type of possible hypothesis will be autonomously pulled from additional external and internal sources. Some data is pulled or retrieved by the gather module for each possible hypothesis. A feedback loop of cooperation occurs between the gather module, the collation module monitoring network and email activity, the comparison module to apply one or more models trained on different aspects of this process, and the cyber threat module to identify cyber threats based on comparisons by the comparison module. While an email module is mentioned, a similar module may be applied to other communication systems, such as text messaging and other possible vectors for malicious activity. Each hypothesis of typical threats can have various supporting points of data and other metrics associated with that possible threat, such as a human user insider attack, inappropriate network behavior, or email behavior or malicious software or malware attack, inappropriate network behavior, or email behavior. A machine-learning algorithm will look at the relevant points of data to support or refute that particular hypothesis of what the suspicious activity or abnormal behavior related for each hypothesis on what the suspicious activity or abnormal behavior relates to. Networks have a wealth of data and metrics that may be collected. The gatherers may then filter or condense the mass of data down into the important or salient features of data. In an embodiment, the collation module and the coordinator module may be portions of the cyber threat module.

A collation module can be configured to collect a set of input data gathered by a cyber defense appliance situated within a network and an optional series of probes deployed to a set of distributed entities such as SaaS or Cloud environments throughout a network. The network entity represents at least one of a user and a network device interacting with the network. The probe data describes any activity executed by a network entity in a distributed network located and administrated by a network administrator and associated with a first network such as a third-party Cloud or SaaS environment. A distributed network may be made up of one or more combinations of devices, sub-networks, virtual networks, virtual servers, virtual devices, Cloud infrastructure, or third party IaaS, PaaS and SaaS Platforms. A network-administrated activity may be network activity, email activity, or other application activity. Further, the collation module may be divided into an email module and a network module. The collation module monitoring network entity activity may feed collected data to a coordinator module to correlate causal links between these activities to supply this input into the cyber threat module. The collation module performs i) passive ingestion of input data as well as ii) potentially active collection of input data and iii) also collates connection content for the other modules.

The cyber threat module may also use one or more machine-learning models trained on cyber threats in the network. The cyber threat module may reference the models that are trained on the normal behavior of user activity and network activity associated with the network. The cyber threat module can reference these various trained machine-learning models and data from the collation module and the trigger module. The cyber threat module can determine a threat risk parameter that factors in how the chain of unusual behaviors correlate to potential cyber threats and 'what is a likelihood of this chain of one or more unusual behaviors of the network activity and user activity under analysis that fall outside of being a normal benign behavior;' and thus, is malicious behavior.

The one or more machine learning models can be self-learning models using unsupervised learning and trained on a normal behavior of different aspects of the system, for example, device activity and user activity associated with a network host, such as a website. The self-learning models of normal behavior are regularly updated. The self-learning model of normal behavior is updated when new input data is received that is deemed within the limits of normal behavior. A normal behavior threshold is used by the model as a moving benchmark of parameters that correspond to a normal pattern of life for the computing system. The normal behavior threshold is varied according to the updated changes in the computer system allowing the model to spot behavior on the computing system that falls outside the parameters set by the moving benchmark.

The comparison module can compare the analyzed metrics on the user activity and network activity compared to their respective moving benchmark of parameters that correspond to the normal pattern of life for the computing system used by the self-learning machine-learning models and the corresponding potential cyber threats.

The comparison module is configured to execute a comparison of input data to at least one machine-learning model to spot behavior on the network deviating from a normal benign behavior of that network entity. The comparison module receives the combined data set from the coordinator module. The at least one machine-learning model is trained on a normal benign behavior of a network entity. The at least one machine uses a normal behavior benchmark describing parameters corresponding to a normal pattern of activity for that network entity. The comparison module can use the comparison to identify whether the network entity is in a breach state of the normal behavior benchmark.

The comparison module can be integrated with the cyber threat module. The cyber security appliance 120 may also include one or more machine-learning models trained on gaining an understanding of a plurality of characteristics on a transmission and related data including classifying the properties of the transmission and its meta data. The cyber threat module can then determine, in accordance with the analyzed metrics and the moving benchmark of what is considered normal behavior, a cyber-threat risk parameter indicative of a likelihood of a cyber-threat.

The cyber security appliance 120 may also include one or more machine learning models trained on gaining an understanding of a plurality of characteristics of a connection event where a network entity interacted with an external host and related data including classifying the properties of the connection event and its meta data.

The cyber threat module can also reference the machine learning models trained on a connection event between a network entity and an external host and related data to determine if an external host connection event or a series of external host connection events under analysis have potentially malicious characteristics. The cyber threat module can also factor this external host connection event characteristics analysis into its determination of the threat risk parameter. The cyber threat module can generate a set of incident data describing an anomalous external host connection event by an entity, here representing a user or a device participating in the network. The cyber threat module can use the incident data to determine whether the anomalous event indicates a breach state representing a malicious incident. The cyber threat module can use the user interface and display module to present the incident data to a user analyst for review, response and/or resolution. Alternately, the cyber threat module can execute an autonomous analyst to use machine learning to determine whether the entity has entered a breach state.

Alternately, the cyber threat module can execute an autonomous analyst to use machine-learning to determine whether the network entity in the breach state is a cyber threat. The cyber threat module is configured to identify whether the breach state identified by the comparison module and a chain of relevant behavioral parameters deviating from the normal benign behavior of that network entity correspond to a cyber threat.

The cyber security appliance 120 may use multiple machine learning models. Each machine learning model may be trained on specific aspects of the normal pattern of life for the system such as devices, users, network traffic flow, outputs from one or more cyber security analysis tools analyzing the system, and others. One or more machine learning models may also be trained on characteristics and aspects of all manner of types of cyber threats. One or more machine learning models may also be trained by observing vectors for malicious activity, such as network activity or emails. One or more machine learning models may be trained by observing the connection events between network entities and external hosts, and the characteristics of the external hosts in question.

The cyber security appliance 120 may supplement the data provided to the users and cyber professionals using a researcher module. The researcher module operates an artificial intelligence (AI) algorithm to assess whether the anomalous network activity has any salient features in common with activity which has previously appeared in other published threat research, whether internal or external, international security community platforms, or known lists of malicious files or internet addresses. The researcher module can consult internal threat databases or external public sources of threat data. The researcher module can collect an outside data set describing at least one of an action or a state related to the cyber threat present outside of the network from at least one data source outside the network. The researcher module is configured to assess the validity of the threat intelligence derived from the intelligent resources through a machine learning modelling of the value of the data and assign a confidence weighting to the external host information gathered from the intelligent resources. The confidence weighting can take into account features such as the internal/external nature of the source, the age of the source, the distance of the source intelligence from the specific external host seen, all assessed by machine learning models to create variable weightings.

The cyber security appliance 120 can then take actions to counter detected potential cyber threats. The autonomous action module, rather than a human taking an action, can be configured to cause one or more rapid autonomous actions to be taken to contain the cyber threat when the threat risk parameter from the cyber threat module is equal to or above an actionable threshold. The cyber threat module's configured cooperation with the autonomous action module, to cause one or more autonomous actions to be taken to contain the cyber threat, improves computing devices in the email system by limiting an impact of the cyber threat from consuming unauthorized CPU cycles, memory space, and power consumption in the computing devices via responding to the cyber threat without waiting for some human intervention.

The cyber threat defense system can collect data from a set of external third-party sources to accurately assess network hosts accessed by a network entity. A network entity represents a user or a network device on a network. The collation module can collect, by passive ingestion of a cyber defense appliance situated at some point within the network and one or more optional probes communicating with a distributed network entity, a host identifier identifying an external host accessed by a network entity and the characteristics of the connection event. Upon identifying the host, the cyber threat defense system can have a researcher module configured to collect host research data from an intelligence resource. The host research data describes the external host identified by the collation module. The intelligence resource is a data source not affiliated with the main network. The researcher module is configured to periodically refresh this host research data to maintain up to date content regarding the external host.

The cyber threat defense system can have a host module configured to determine one or more host metrics using one or more machine learning models. The host module can train the one or more machine learning models on a normal benign connection behavior between an external host and a network entity to spot behavior deviating from the normal benign external host connection behavior. The machine learning model uses a normal host behavior benchmark. The normal host behavior benchmark describing parameters corresponding to a normal pattern of activity for a communication between a network entity and an external host, and the 'normal' characteristics of observed external hosts derived by the collation module. Further, the host module is configured to associate a connection entity data set with the host identifier and derive a network entity alias for the network entity from observed behavior across the network. An entity data set describes the characteristics of at least one interaction between the network entity and the external host. A network alias describes the possible derived role of the network entity in the network, such as a Server or a Desktop, as identified by the cyber threat defense system from behavioral markers.

The cyber threat defense system can have a scoring module configured to analyze the host research data from the researcher module in collaboration with the host metrics from the host module. The scoring module may take into account the confidence weightings created by the researcher module and attributed to the host research data when performing an analysis. The scoring module is configured to generate an automatic threat score describing an autonomously-determined threat level presented by the external host based on at least the host research data. The scoring module can factor the connection entity data set into calculation of the automatic threat score as an indicator of network-wide and peer-wide interaction with the external host. The automatic threat score may be generated based upon only the host research data and a machine learned clustering of similarly characterized external hosts, before a network entity is even seen interacting with the host. The scoring module is configured to update the automatic threat score based on at least one analyst threat score describing an analyst-determined threat level. The scoring module is configured to update the automatic threat score based on periodically updated data from the researcher module.

Once the scoring module calculates an automatic threat score, the cyber threat defense system has a user interface module to present that score to a user analyst. The user interface module is configured to generate a threat-tracking graphical user interface to present to the user analyst in a display. The user interface module is configured to present input data in the threat-tracking graphical user interface. The input data may list a series of host identifiers representing external hosts visited by the network entity. The user interface module can identify a hover-over input over one of the external host identifiers. A hover-over input is an input received by hovering a cursor over the external host identifier without clicking on the external host identifier. The user interface module is configured to generate a hover-over box in response to the hover-over input. The hover-over box presents the automatic threat score to the user analyst. The user interface module can identify a clickthrough input in relation to the host identifier. A clickthrough input is an input received by a user clicking on the external host identifier. The user interface module is configured to generate a popup box to present the automatic threat score in response to a clickthrough input. The user interface module is configured to operate the popup box.

The popup box can present an anonymized alias for network entity data values such as host name or username, representing the network entity without compromising any personally identifiable information. A system user with sufficient clearance can reveal the true value of the network entity data fields if malicious activity is discovered. The popup box can present the host identifier to indicate the external host being investigated. The popup box can present the host research data the researcher module has collected from an intelligence resource. The popup box can present the automatic threat score describing an autonomously-determined threat level based on the host research data. The popup box can receive an analyst threat score from the user analyst. The analyst threat score describes an analyst-determined threat level. The scoring module can create a combined threat score based on the analyst threat score and the automatic threat score. The popup box can receive an analyst context comment from the user analyst. The analyst context comment explains the reasoning behind the analyst threat score.

Alternately, the popup box can receive an analyst threat score from an autonomous analyst. In the case of an autonomous analyst, an analyst threat score may represent a judgement based on the severity of the breach state where the external host was observed by the autonomous analyst as involved in the cyber threat breach. The scoring module can create a combined threat score based on the autonomous analyst threat score and the automatic threat score. The popup box can receive an analyst context comment from the autonomous analyst. The autonomous analyst context comment may present salient features of the analysis by the autonomous analyst such as filenames, file hashes, and IP addresses involved in the breach. The autonomous analyst context comment may also describe one or more salient features of the breach state observed by the autonomous analyst where the external host was linked to the formation of the breach state, such as IP Addresses or File Hashes.

The popup box can present a prior analyst threat score to the user analyst. The prior analyst threat score describes a prior analyst-determined threat level assigned by a prior user analyst. The prior user analyst may be in a trusted community of the user analyst assigned by the user to prevent both the inclusion of commentary which exposes confidential information to outside individuals and to avoid the inclusion of commentary or scores from unvetted or untrusted individuals with potential ulterior motives. The popup box can present a prior analyst context comment from the prior user analyst. The prior analyst context comment explains the reasoning behind the prior analyst threat score.

The popup box can present a prior analyst address. The prior analyst address represents the prior user analyst. Upon the user analyst selecting the prior analyst address, a communication module can establish a communication channel between the user analyst and the prior user analyst. The communication channel may be a text or email from the current user analyst to allow the user analyst to receive guidance from the prior analyst. Alternately, if the prior user analyst is available, the communication channel may be a chat, a video chat, or telephone call between the current user analyst and the prior user analyst.

The host module is configured to create a host cluster, by grouping previous external hosts sharing similar characteristics to the current external host. The popup box may present a cluster threat score, averaging the automatic threat scores for that host cluster. A host module may place an external host in more than one cluster. The host-based clustering can produce predictions on external hosts before they are observed interacting with network entities based upon a machine learning analysis of their shared characteristics and relationship to known bad external hosts. The scoring module may be configured to periodically update the automatic threat score based upon the change in average automatic threat scores for the host cluster.

Further, the user analyst can enter a threat tag via the popup box. The threat tag describes the type of threat presented by the external host to the network, and can be determined by the user analyst. If an autonomous analyst is executed by the cyber threat appliance, the tag may be selected and assigned by the autonomous analyst after categorizing the observed breach state (such as Ransomware Attack, DNS Sinkhole). The threat tag may also be suggested to a user analyst based upon closely clustered hosts. The host module is configured to group the external host in a host set based on the threat tag. For example, if the user analyst determines that the external host is distributing malware, the user analyst may enter a "malware distributer" tag to be associated with the external host. The popup box may present a tag threat score, averaging the automatic threat scores for hosts associated with that threat tag. The scoring module may update the automatic threat score based upon the automatic threat score or user analyst score for external hosts with the same tags, or based upon a general threat score associated with specific tags (such as Malware Distributor, Botnet).

The host module is configured to suggest external hosts recently seen on the cyber threat appliance which share one or more characteristics, threat tags or are closely clustered with the external host under investigation. The host module may prompt the user analyst to look at the breach state where this similar external host was involved, or investigate whether that previous appearance of a similar host was itself a breach state.

The popup box can present a malignant external host identifier set. The malignant external host identifier set represents external hosts previously accessed by the network entity. The host module can filter the malignant external host identifier set to those external hosts with an automatic threat score in a range specified by the user analyst. The host module can set the range to a default range if no range is entered by the user analyst.

The researcher module, the scoring module, and the host module, or any combination thereof, may be components of a single module.

The autonomous action module is configured to execute at least one autonomous based on the automatic threat score generated by the scoring module. The autonomous action module can alert the user analyst of an external host with an automatic threat score in a specified range. The autonomous action module can preserve these alerts in a graphical user interface until a user analyst is available for review. The autonomous action module can quarantine the external host, removing access by any part of the network. The autonomous action module can limit the privileges in relation to the rest of the network of any network entity exposed to the external host.

The cyber security appliance 120 may be hosted on a device, on one or more servers, or in its own cyber threat appliance platform.

Figure 5:
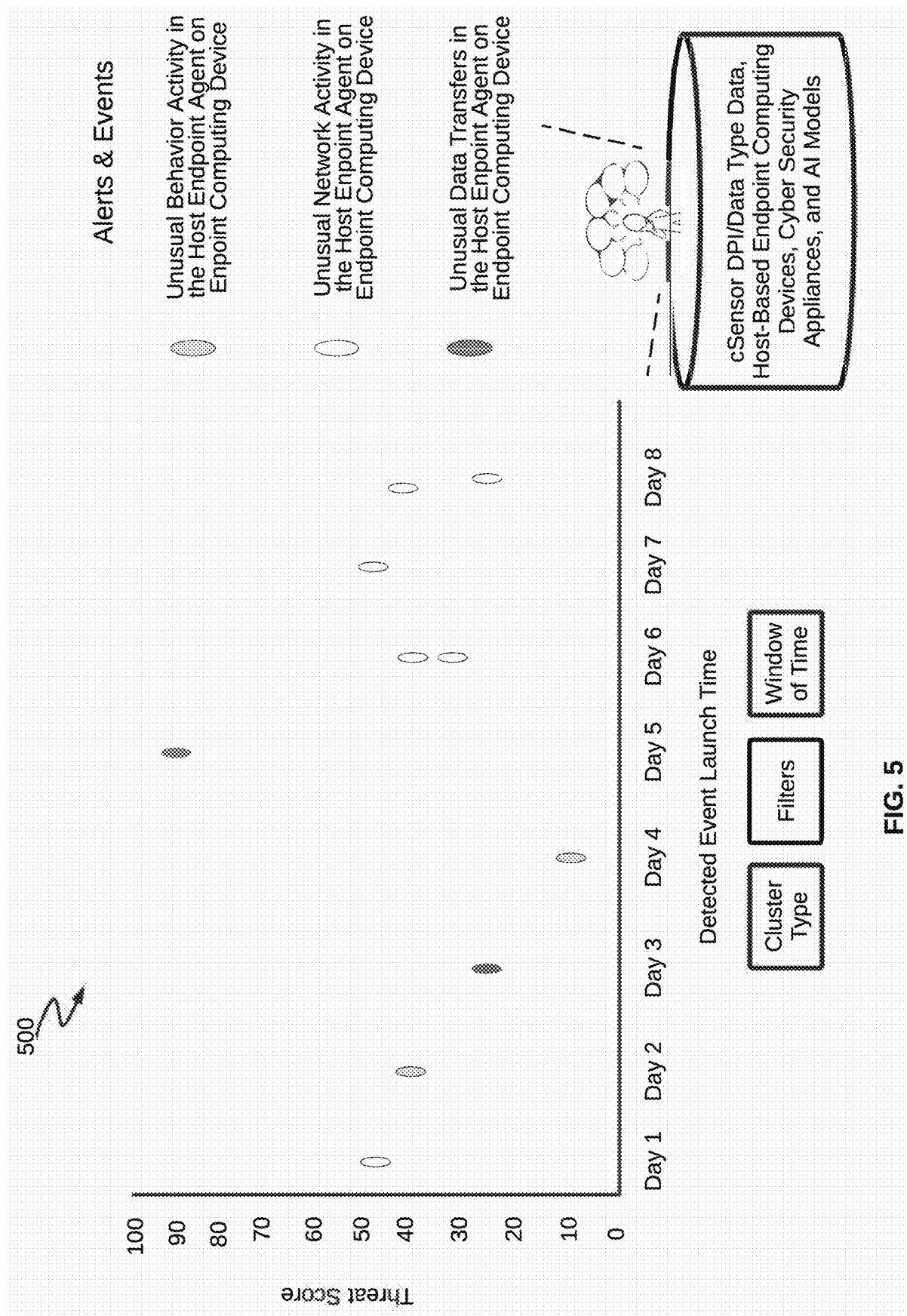
FIG. 5 illustrates a block diagram of a graph depicting various types of observed network events of unusual behavior in relation to their respective threat scores and event launch times, in accordance with an embodiment of the disclosure.

Referring now to FIG. 5, an exemplary graph 500 for depicting events and alerts triggered by various detected unusual network connectivity and behavior pattern data in relation to their cyber-threat scores and detected event launch times is shown, in accordance with an embodiment of the disclosure. The graph 500 may depict a cluster of unusual behaviors detected and analyzed in a cyber security platform, where the cluster of detected unusual behaviors may include, but are not limited to, any detected unusual payload activations based on any types of observed network activity events, such as the illustrated network, data, behavior pattern activities. For example, the graph 500 may depict one or more different machine learning models (as described above) that are trained to analyze any detected unusual behavior patterns from the collected pattern of life data against the normal pattern of life from any collected data from any of the entities in the organization. For example, the endpoint agent cSensor described above may use its analyzer module and cooperating modules to ingest all (or some) of this illustrated data to create various threat visualizer instances, reports, scenarios, and so on.

In some embodiments, the graph 500 may be provided as a user interface used to show a user the cluster of alerts and/or events associated with the variety of detected unusual network activity, data transfers, and behavior patterns, which may further include the respective detailed labels of the characteristics of such detected alerts and/or events. Note that, in these embodiments, the endpoint agent cSensor may utilize any of the AI models described above for any of its trained contextual knowledge of the organization which includes language-based data, email and network connectivity and behavior pattern data, and historic knowledgebase data.

In other examples, a behavioral pattern analysis of what are the unusual behaviors of the email/network/system/device/user under analysis by the machine learning models may be as follows. The cyber defense system uses unusual behavior deviating from the normal behavior and then builds a sequence of unusual behavior and the causal links between that sequence of unusual behavior to detect cyber threats as shown with the graph 600 in FIG. 6. In additional embodiments, the unusual patterns may be determined by filtering out what activities/events/alerts that fall within the window of what is the normal pattern of life for that network/system/device/user under analysis, and then the pattern of the behavior of the activities/events/alerts that are left, after the filtering, can be analyzed to determine whether that pattern is indicative of a behavior of a malicious actor—human, program, or other threat.

Next, the cyber defense system can go back and pull in some of the filtered out normal activities to help support or refute a possible hypothesis of whether that pattern is indicative of a behavior of a malicious actor. The analyzer module can cooperate with one or more models trained on cyber threats and their behavior to try to determine if a potential cyber threat is causing these unusual behaviors. If the pattern of behaviors under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber defense system is configurable in a user interface, by a user, enabling what type of automatic response actions, if any, the cyber defense system may take when different types of cyber threats, indicated by the pattern of behaviors under analysis, that are equal to or above a configurable level of threat posed by this malicious actor.

The AI models may perform by the threat detection through a probabilistic change in a normal behavior through the application of an unsupervised Bayesian mathematical model to detect behavioral change in computers and computer networks. The core threat detection system is termed the 'Bayesian probabilistic'. The BP approach can determine periodicity in multiple time series data and identify changes across single and multiple time series data for the purpose of anomalous behavior detection. From the email and potentially IT network raw sources of data, a large number of metrics can be derived each producing time series data for the given metric.

The detectors in the analyzer module including its network module (simulator can get extract meta data from network module) and email module components can be discrete mathematical models that implement a specific mathematical method against different sets of variables with the target. Thus, each model is specifically targeted on the pattern of life of alerts and/or events coming from, for example, i) that cyber security analysis tool analyzing various aspects of the emails, iii) coming from specific devices and/or users within a system, etc. At its core, the endpoint agent cSensor as well as the cyber security appliance may mathematically characterize what constitutes 'normal' behavior in line with the normal pattern of life for that entity and organization based on the analysis of a large number/set of different measures of a device's network behavior. Such red team and appliance can build a sophisticated 'pattern of life'—that understands what represents normality for every person, device, entity, email activity, and network activity in the system being protected by the cyber threat defense system. For example, the analyzer module may rank supported candidate cyber threat hypotheses by a combo of likelihood that this candidate cyber threat hypothesis is supported and a severity threat level of this incident type.

In addition, the correlation of the reporting and formatting modules may be configured to generate the report (or the graphs) with the identified critical devices connecting to the virtualized instance of the network under analysis that should have the priority to allocate security resources to them, along with one or more portions of the constructed graph. The formatting module may have an autonomous email-report composer that cooperates with the various AI models and modules of the AI adversary red team as well as at least a set of one or more libraries of sets of contextual text, objects, and visual representations to populate on templates of pages in the email threat report based on any of the training and/or simulated attacking scenarios observed. The autonomous email-report composer can compose an email threat report on cyber threats that is composed in a human-readable format with natural language prose, terminology, and level of detail on the cyber threats aimed at a target audience being able to understand the terminology and the detail. Such modules and AI models may cooperate with the autonomous email-report composer to indicate in the email threat report, for example, an email attack's purpose and/or targeted group (such as members of the finance team, or high-level employees).

The formatting module may format, present a rank for, and output the current email threat report, from a template of a plurality of report templates, that is outputted for a human user's consumption in a medium of, any of 1) a printable report, 2) presented digitally on a user interface, 3) in a machine-readable format for further use in machine-learning reinforcement and refinement, and 4) any combination of the three. The system may use at least three separate machine learning models or any particular number of separate AI machine learning models. For example, a machine learning model may be trained on specific aspects of the normal pattern of life for entities in the system, such as devices, users, email/network traffic flow, outputs from one or more cyber security analysis tools analyzing the system, etc. One or more machine learning models may also be trained on characteristics and aspects of all manner of types of cyber threats. One or more machine learning models may also be trained on composing email threat reports.

The various modules cooperate with each other, the AI models, and the data store to carry out the operations discussed above with regard to the AI adversary red team. Such modules may cooperate to improve the analysis of the how vulnerable the organization is based on any of the observed (or trained/simulated/pentested) unusual events are to that specific organization and thus improve the formalized report generation with specific vulnerabilities and the extend of those vulnerabilities with less repetition to consume less CPU cycles, as well as doing this more efficiently and effectively than humans. For example, the modules can repetitively go through these steps and re-duplicate steps to filter and rank the one or more supported possible cyber threat hypotheses from the possible set of cyber threat hypotheses and/or compose the detailed information to populate into the email threat report. Note that, one or more processing units are configured to execute software instructions associated with the AI adversary red team and any of its cooperating modules in that depicted system. Also note, that one or more non-transitory storage mediums are configured to store at least software associated with the endpoint agent cSensor simulator/apparatus, the other modules, and the AI models and classifiers.

Figure 6:
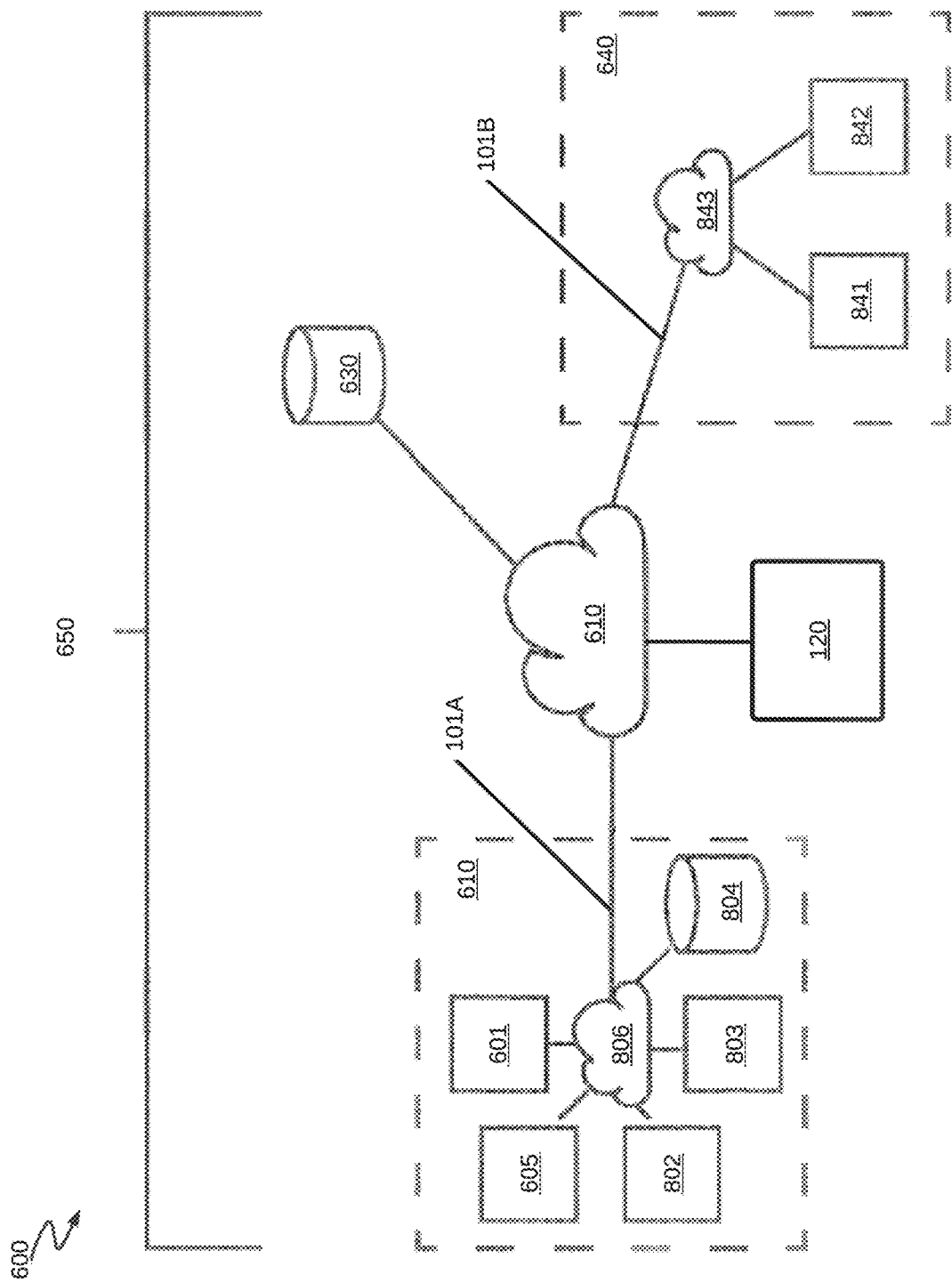
FIG. 6 illustrates a block diagram of an exemplary AI based cyber security system having an AI based cyber security appliance with one or more endpoint agents that are protecting a network, a database server, and one or more computing devices, in accordance with an embodiment of the disclosure.
Figure 7A:
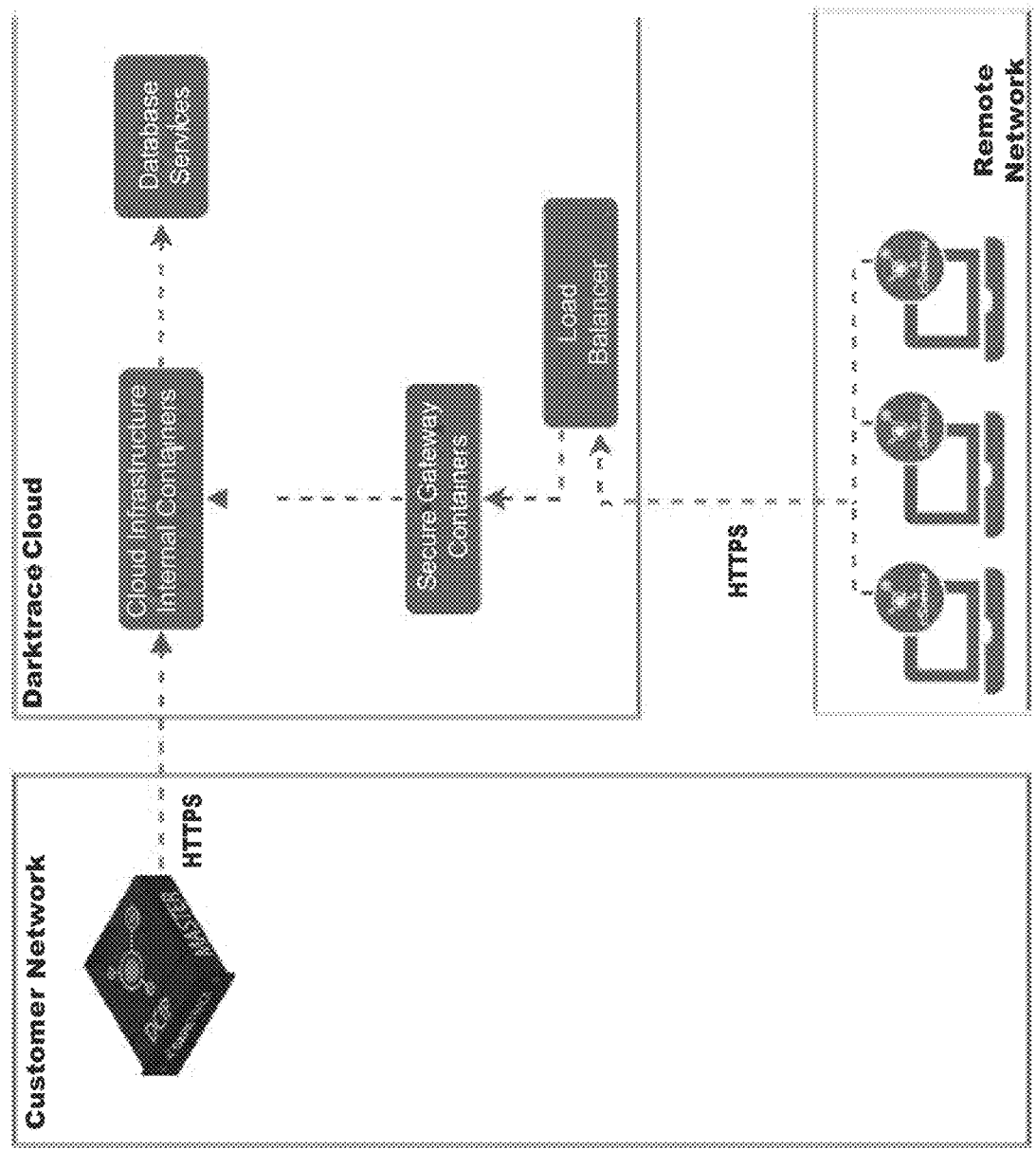
FIGS. 7A-J illustrate a series of exemplary block diagram illustrations of a cyber security system with regard to the cyber security system in FIG. 1, in accordance with embodiments of the disclosure.
Figure 7B:
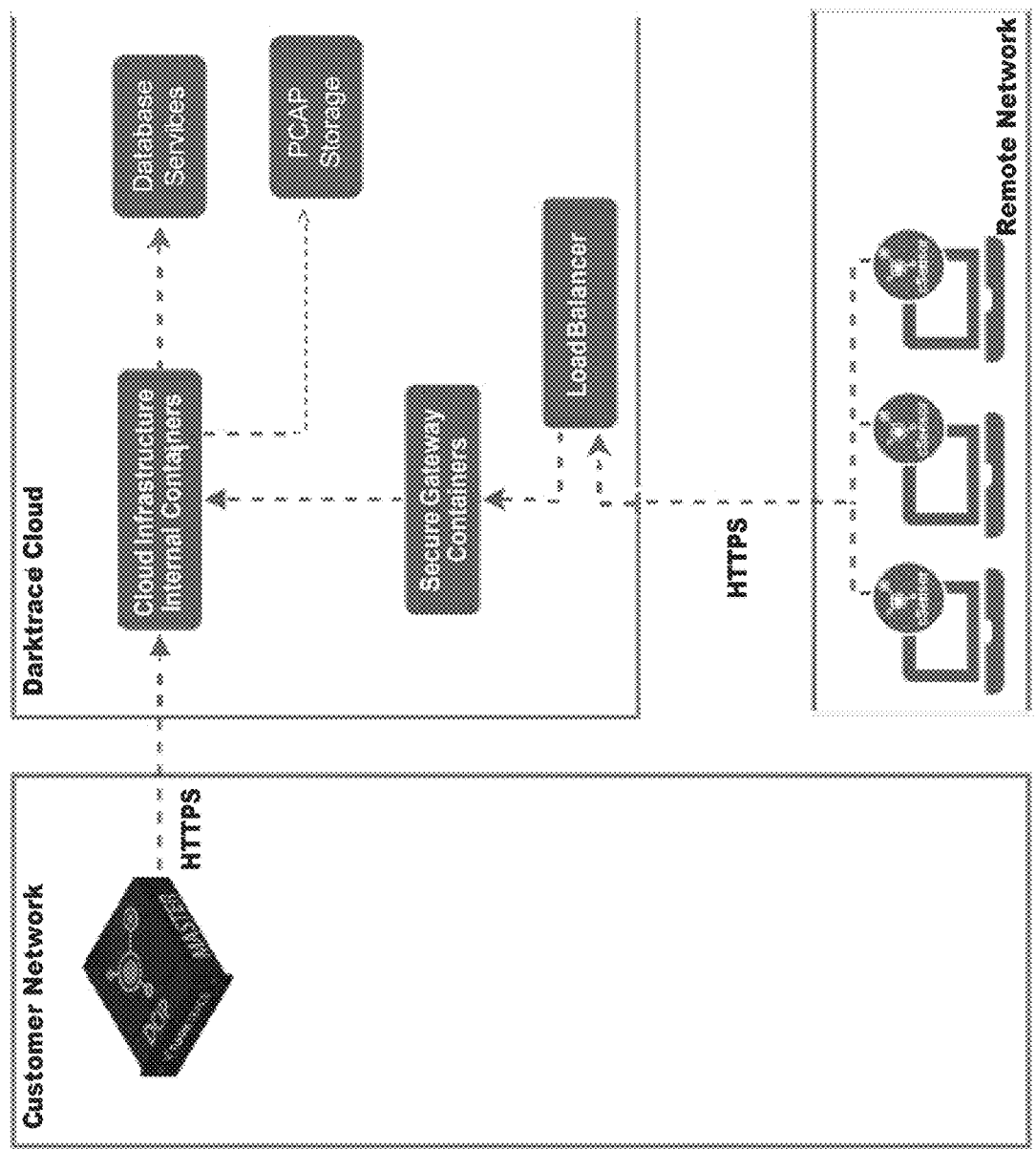
Figure 7C:
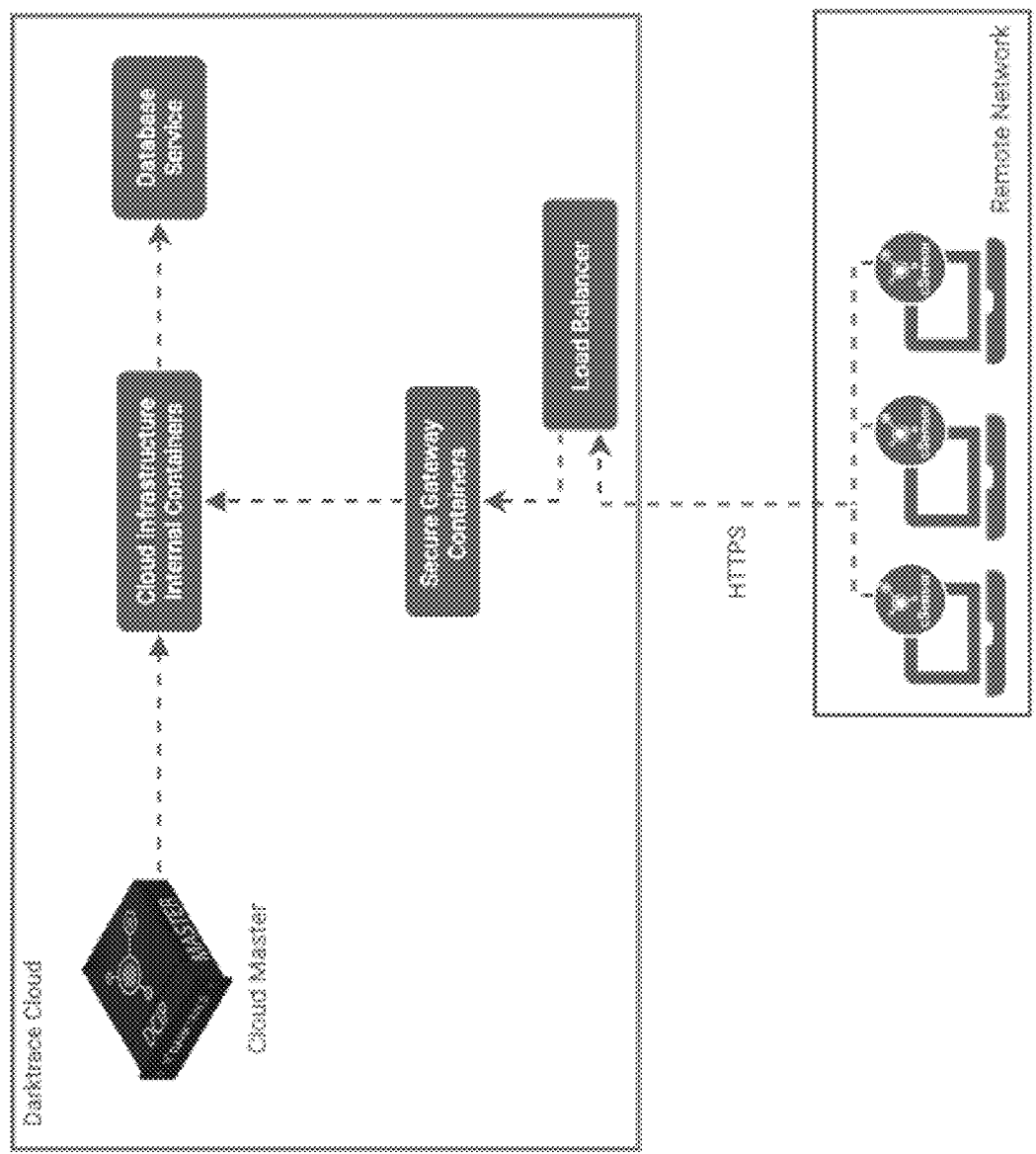
Figure 7D:
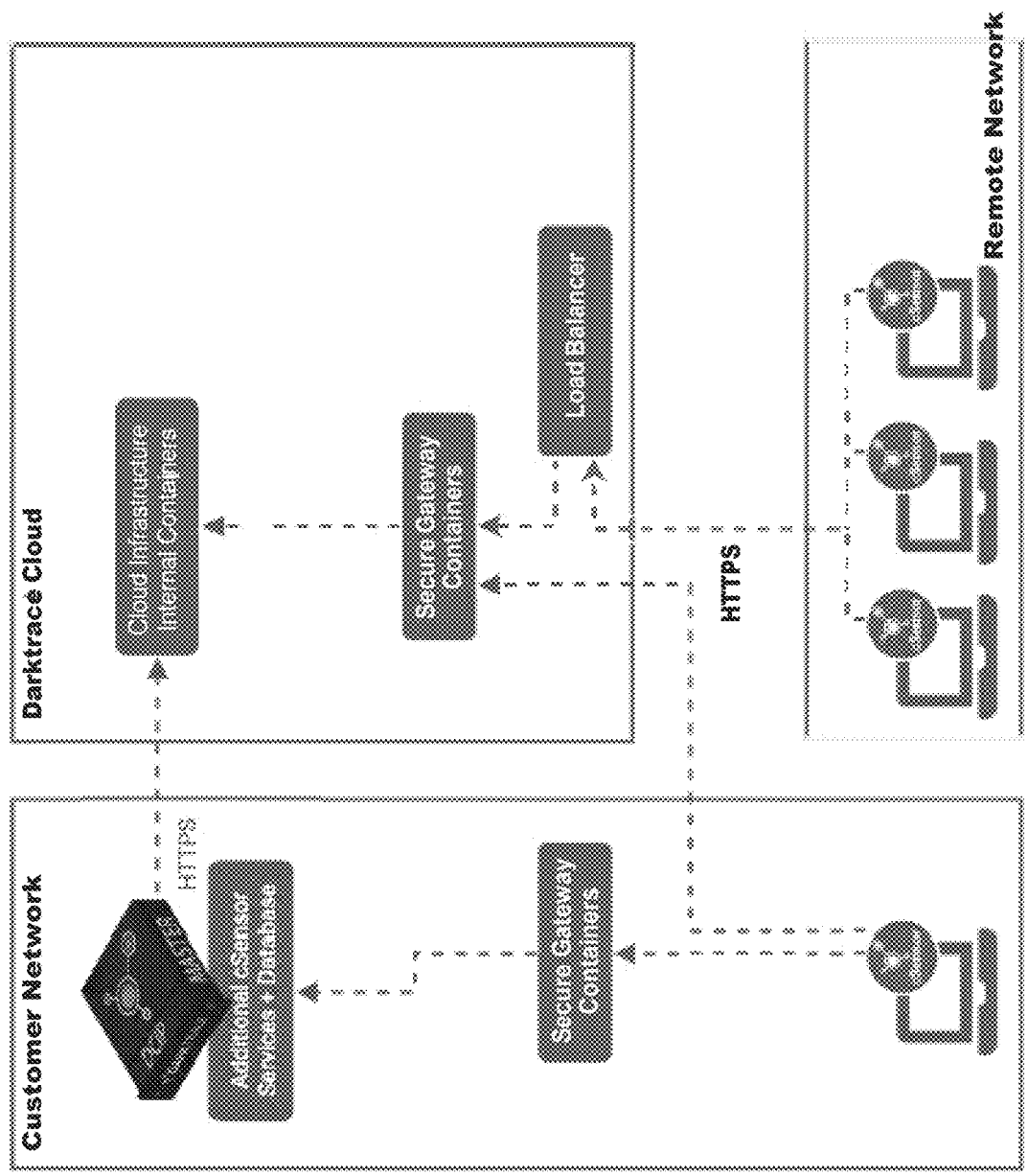
Figure 7E:
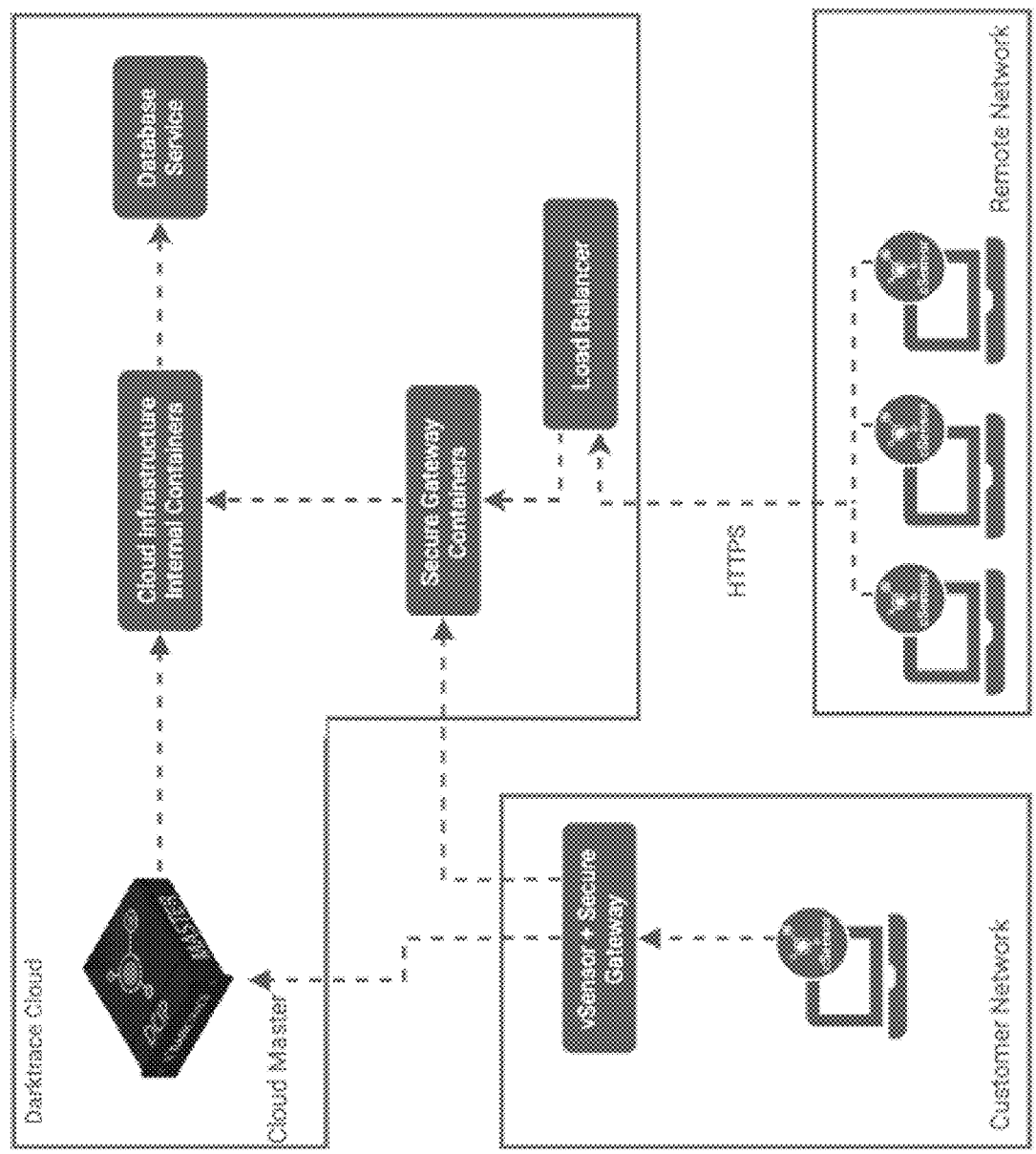
Figure 7F:
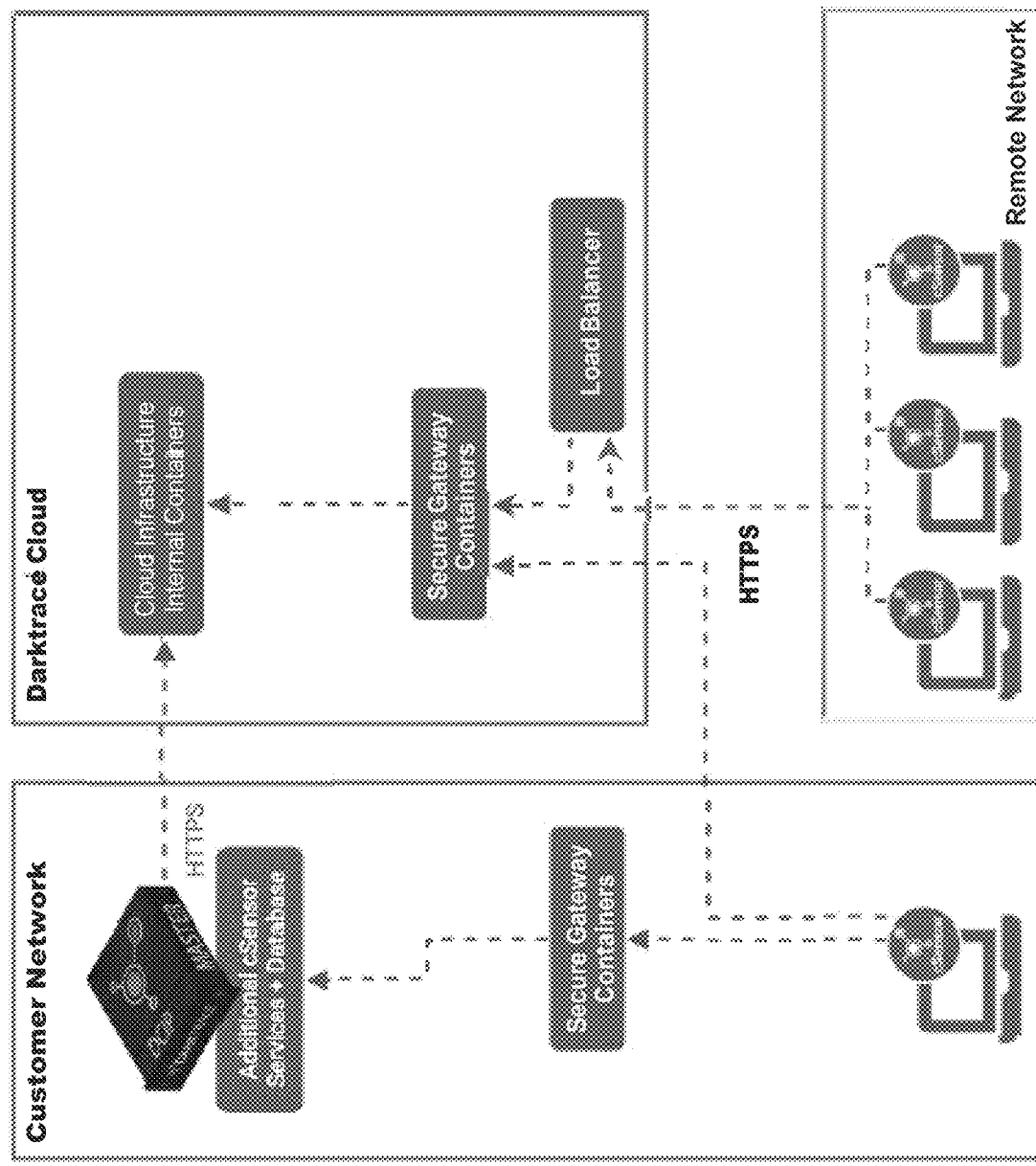
Figure 7G:
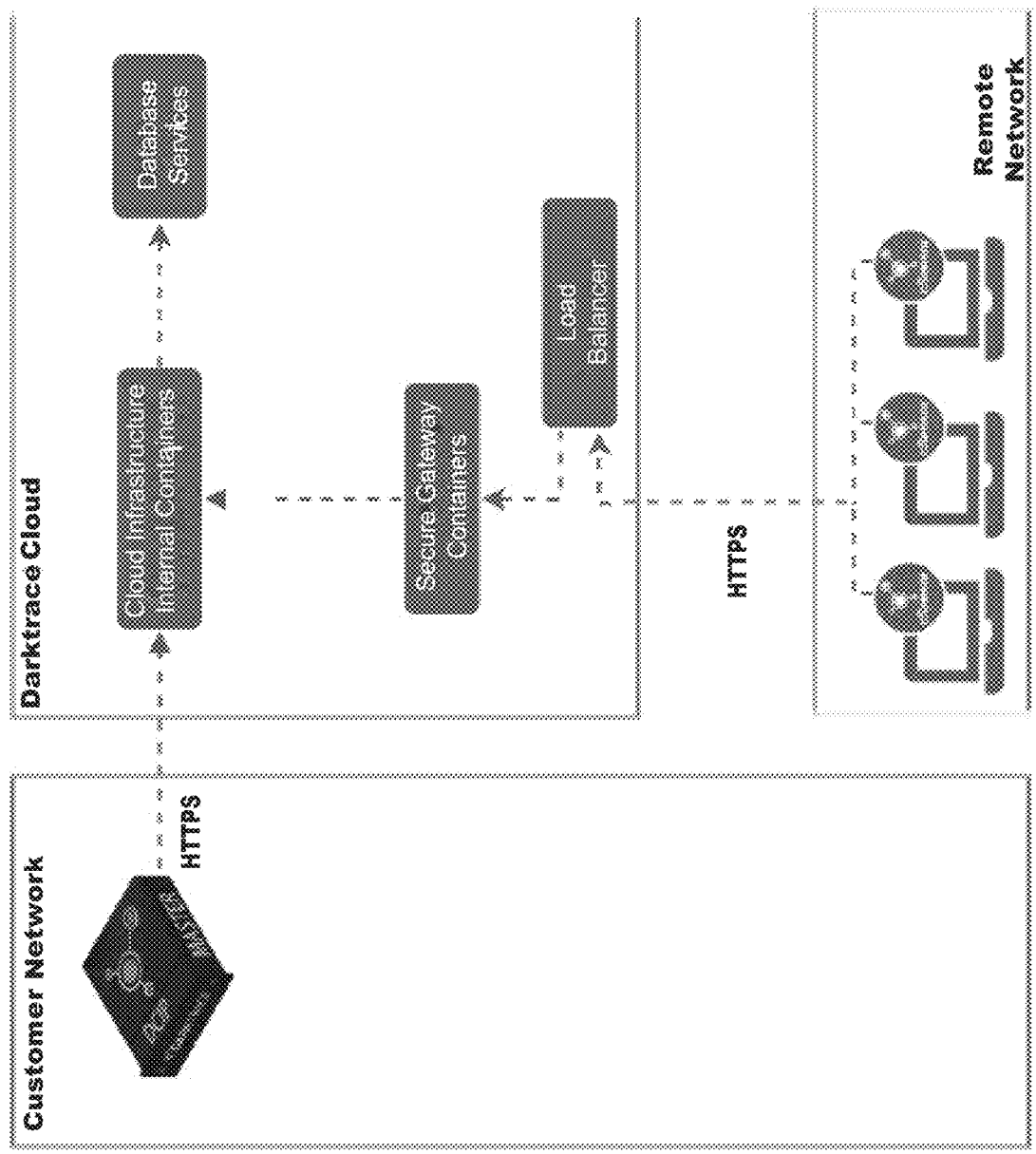
Figure 7H:
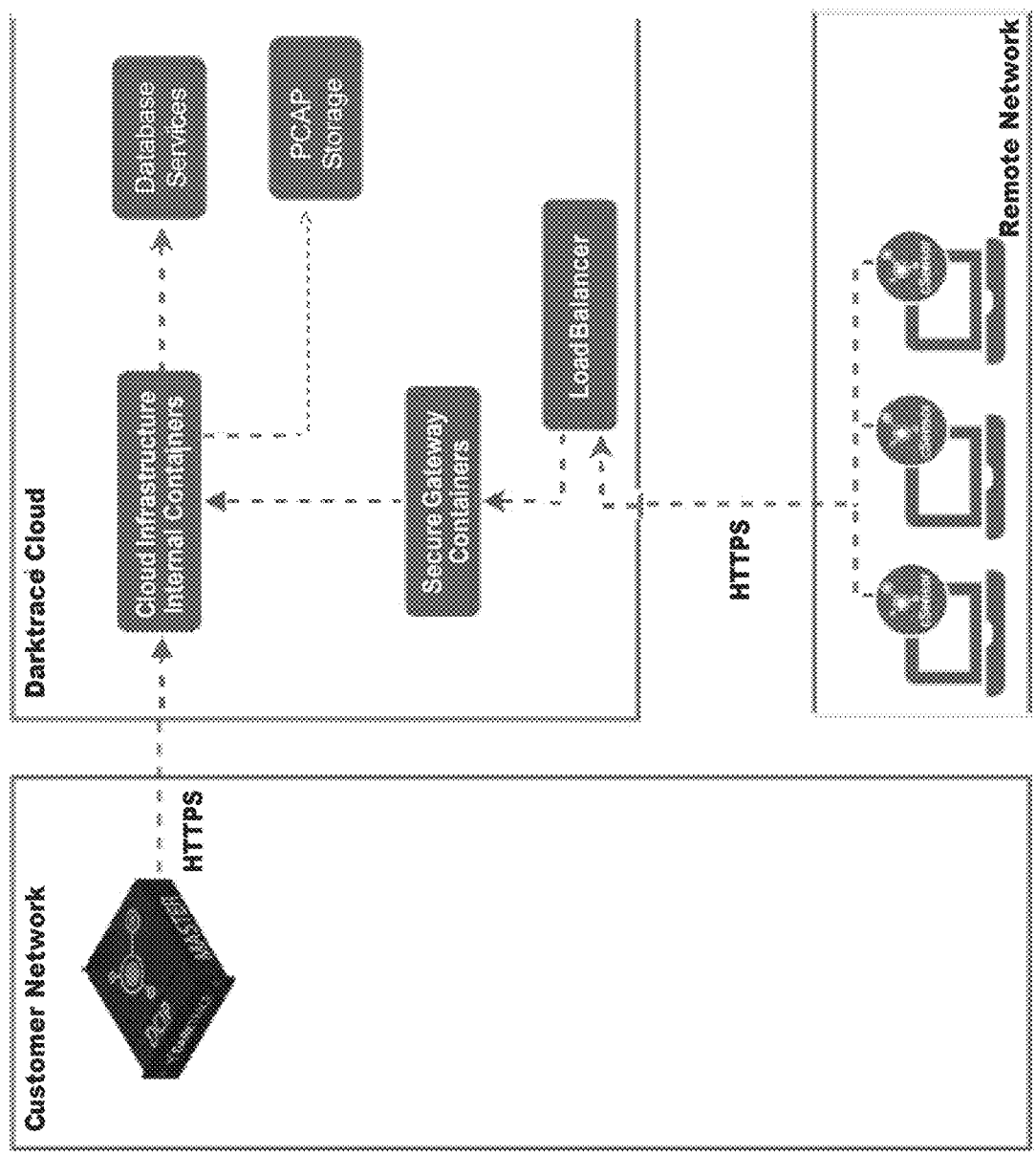
Figure 7I:
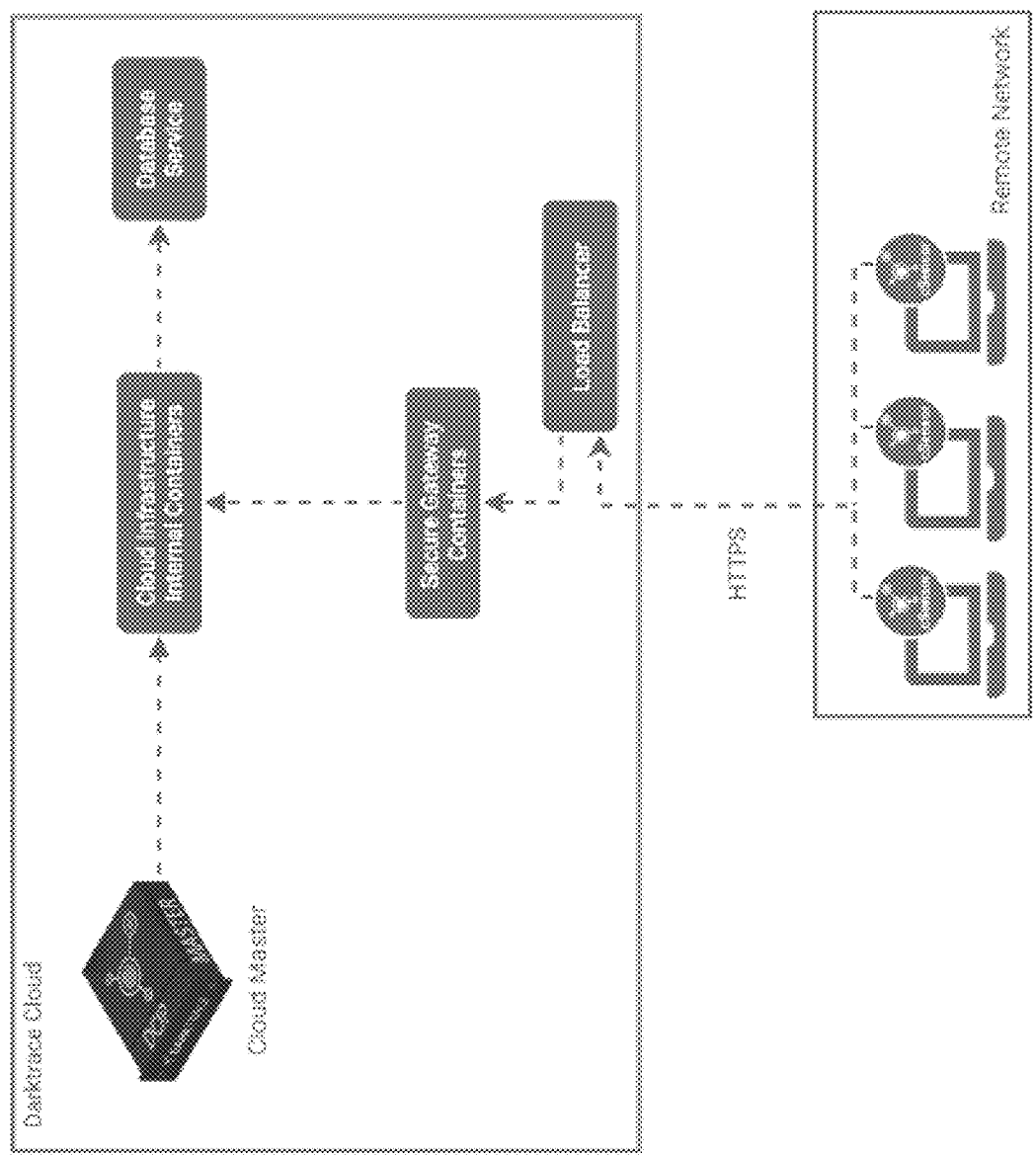
Figure 7J:
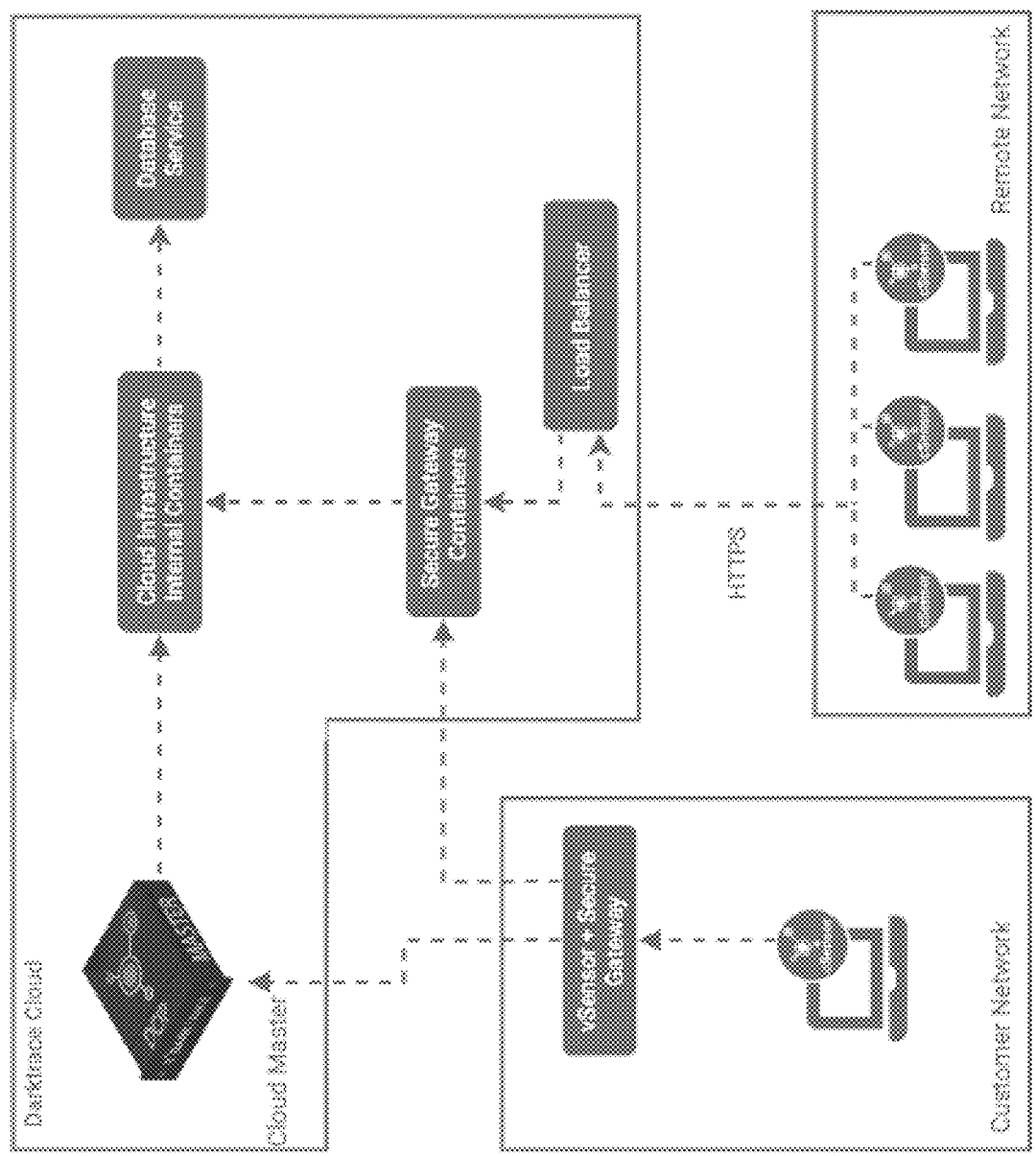

Referring now to FIG. 6, an exemplary block illustration of a cyber security system 600 having a cyber security appliance 120 with one or more endpoint agents 101A-B protecting a network 610, a database server 630, and one or more computing devices 610 and 640 are shown, in accordance with embodiments of the disclosure. In the illustrated embodiments, the illustrated cyber security system 600 may include a network of computer systems 650 implementing the cyber threat detection systems, methods, and devices described herein. The cyber threat defense system 600 depicted in FIG. 6 may be similar to the cyber security systems 100 and 200 depicted above in FIGS. 1-2. For example, the cyber threat defense system 600 may configure the endpoint agents 111A-B with their respective cSensors 105A-B (and/or the cyber security appliance 120) to extend visibility and monitor the computing devices 610 and 640 communicatively coupled over the network 610.

As shown in FIG. 6, the cyber threat defense system 600 may include a network of computer systems 650 that may be using the endpoint agent cSensors 105A-B as well as the cyber security appliance 120. The exemplary system 600 depicted by FIG. 6 may be a simplified illustration, which is provided for ease of explanation of the present disclosure. For example, the network of computer systems 650 may comprise a first computer system 610 within a building, which uses the cyber threat detection system 600 to detect and thereby attempt to prevent threats to computing devices within its bounds. The first computer system 610 may comprise one or more computers 601-603, a local server 604, and a multifunctional device 605 that may provide printing and facsimile functionalities to each of the respective computers 601-603. All of the devices within the first computer system 610 may be communicatively coupled via a first network 606, such as a Local Area Network (LAN) and/or the like. Consequently, all of the computers 601-603 may be able to access the local server 604 via the network 606 and use the functionalities of the multifunctional device 605 via the network 606.

Moreover, the network 606 of the first computer system 610 may be communicatively coupled to the network 110 (e.g., the Internet), which may in turn provide the computers 601-603 with access to a multitude of other computing devices including the database server 630 and the second computer system 640. For example, the second computer system 640 may also include one or more computers 641-642 that may be communicatively coupled to each other via a second network 643 (or a second LAN).

A real-time threat detection system having autonomous actions with definitive network and/or endpoint evidence to enable rapid threat investigation and remediation is needed. In particular, a system that gives the ability to deploy instances of a host-based endpoint agent in a computing device as well as the capability to integrate the host-based endpoint agent with various operating systems (OSs) residing in the computing device is needed. Furthermore, a cyber defense platform having a series of endpoint agent sensors to monitor various types of network activities of remote entities and promptly deliver key network activity data to master appliances within a remote network defense system is needed. For example, a set of remote working devices and those remote devices that generally are not seen adequately using bulk network traffic mirroring probes/sensors is needed—in order to achieve greater and simpler extended visibility as well as increased amounts of entity identity data available for tracking.

In this exemplary embodiment, the computer 601 on the first computer system 610 may be configured by an AI cyber threat security detection system, such as the system 600 and any of the other AI based systems 100 and 200 depicted above, and therefore runs the necessary AI based threat detection processes for pentesting various attacks on the first computer system 610 for training and/or detecting vulnerabilities in that system 610. Additionally, as such, it comprises a processor arranged to run the steps of the processes described herein, memory required to store information related to the running of such processes, as well as a network interface for collecting the required information and so on. This process shall now be described in greater detail below with reference to FIG. 6.

The computer 601 may build and maintain a dynamic, ever-changing model of the 'normal behavior' of each user and machine within the system 610. The approach is based on Bayesian mathematics, and monitors all interactions, events and communications within the system 610—which computer is talking to which, files that have been created, networks that are being accessed, and so on.

For example, the computer 602 may be based in a company's San Francisco office and operated by a marketing employee who regularly accesses the marketing network, usually communicates with machines in the company's U.K. office in second computer system 640 between 9:30 AM and midday and is active from about 8:30 AM until 6 PM. The same employee virtually never accesses the employee time sheets, very rarely connects to the company's Atlanta network and has no dealings in South-East Asia. The AI based cyber threat detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The cyber security system with the cSensors and other similar apparatus/simulators may be built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles may be stolen so infrequently that they do not impact machine performance. But however cloaked and sophisticated the attack is, there will always be a measurable delta, even if extremely slight, in typical machine behavior, between pre and post compromise. This behavioral delta may be observed and acted on with the form of Bayesian mathematical analysis used by the AI based cyber threat security detection system installed on the computer 601.

The AI-based cyber threat security/defense self-learning platform may use machine-learning technology. The machine-learning technology, using advanced mathematics, may detect previously unidentified threats, without rules, and automatically defend networks. Note, today's attacks may be of such severity and speed that a human response may not happen quickly enough. Thanks to these self-learning advances, it is now possible for a machine to uncover emerging threats and deploy appropriate, real-time responses to fight back against the most serious cyber threats.

This system may therefore be built and trained to have a sophisticated 'pattern of life'—that understands what represents normality for every person, device, and network activity associated with any of the users and/or entities in such system being protected by such AI cyber threat security system. The cyber security system may have the ability to self-learn and detect normality in order to spot true anomalies, allowing organizations of all sizes to understand any unusual behaviors of users, machines, tokens (or symbols, process chains, etc.), and so on, observed within any respective and discrete host device(s) and network(s) at both an individual and group level. Monitoring behaviors, rather than using predefined descriptive objects and/or signatures, means that more attacks may be spotted ahead of time and extremely subtle indicators of wrongdoing may be detected. Unlike traditional legacy defenses, a specific attack type or new malware does not have to have been seen first before it may be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This AI cyber security system with the cSensors and other sensors may thus be capable of making value judgments and carrying out higher value, more thoughtful tasks. Machine learning requires complex algorithms to be devised and an overarching framework to interpret the results produced. However, when applied correctly these approaches may facilitate machines to make logical, probability-based decisions and undertake thoughtful tasks.

Advanced machine-learning is at the forefront of the fight against automated and human-driven cyber-threats, overcoming the limitations of rules and signature-based approaches: (i) The machine-learning learns what is normal within a network—it does not depend upon knowledge of previous attacks. (ii) The machine-learning thrives on the scale, complexity and diversity of modern businesses, where every device and person is slightly different. (iii) The machine-learning turns the innovation of attackers against them—any unusual activity is visible. (iv) The machine-learning constantly revisits assumptions about behavior, using probabilistic mathematics. (v) The machine-learning is always up to date and not reliant on human input.

Utilizing machine-learning in cyber security technology is difficult, but when correctly implemented it is extremely powerful. The machine-learning means that previously unidentified threats may be detected, even when their manifestations fail to trigger any rule set or signature. Instead, machine-learning allows the system to analyze large sets of data and learn a 'pattern of life' for what it sees. Machine learning may approximate some human capabilities to machines, such as: (i) thought: it uses past information and insights to form its judgments; (ii) real time: the system processes information as it goes; and (iii) self-improving: the model's machine-learning understanding is constantly being challenged and adapted, based on new information. New unsupervised machine-learning therefore allows computers to recognize evolving threats, without prior warning or supervision.

Note that, in other embodiments, one or more other detectors and data analysis process may be employed as detailed below, without limitations.

Referring now to FIGS. 7A-J, a series of exemplary block illustrations of a cyber security system 700-710 is shown, in accordance with embodiments of the disclosure. As illustrated in FIG. 7A-J, the cyber security system 700-710 may be substantially similar to the cyber security system 100 depicted in FIG. 1, with the exceptions that the respective systems 700-710 depict one or more different network configurations using the same components and processes described above in FIG. 1. For example, the cyber security systems 700-710 depicted in FIGS. 7A-J may be configured based on: (1) most common basic arrangement with an on-prem master appliance; (2) moves some PCAP storage from the on-prem master to the cloud, the aim here is to reduce the bandwidth of the Master↔Cloud connection by retaining PCAP data in the Cloud and serving requests for it from there; (3) basic arrangement with a Cloud Master; (4) a hybrid arrangement with an on-prem Master, where most of the original Cloud server functions and database now reside on the Master and there is a fully on-prem route for local cSensor data to take, such that the aim is to remove the need for most cSensor bandwidth to go out of and back into the on-prem network if the cSensor itself is already within that network; and (5) a hybrid arrangement with a Cloud Master and an on-prem vSensor, the aim here is to retain PCAP data within the on-prem network instead of sending it to the Cloud.

Unsupervised Machine Learning

Unsupervised learning works things out without predefined labels. In the case of sorting the series of different animals, the system analyzes the information and works out the different classes of animals. This allows the system to handle the unexpected and embrace uncertainty. The system does not always know what it is looking for, but may independently classify data and detect compelling patterns.

The cyber threat defense system's unsupervised machine learning methods do not require training data with predefined labels. Instead, they are able to identify key patterns and trends in the data, without the need for human input. The advantage of unsupervised learning is that it allows computers to go beyond what their programmers already know and discover previously unknown relationships.

The cyber threat defense system uses unique implementations of unsupervised machine learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber threat defense system's unsupervised machine learning on cyber security is transformative: (i) Threats from within, which would otherwise go undetected, may be spotted, highlighted, contextually prioritized and isolated using these algorithms. (ii) The application of machine learning has the potential to provide total network visibility and far greater detection levels, ensuring that networks have an internal defense mechanism. (iii) Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview

In an embodiment, a closer look at the cyber threat defense system's machine learning algorithms and approaches is as follows.

The cyber threat defense system's probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber threat defense system's approach accounts for the inevitable ambiguities that exist in data and distinguishes between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber threat defense system mathematically characterizes what constitutes 'normal' behavior based on the analysis of a large number/set of different measures of a devices network behavior, examples include at least one or more of: server access; data access; timings of events; credential use; DNS requests; and/or any other similar parameters. Each measure of network behavior is then monitored in real time to detect anomalous behaviors.

Clustering

To be able to properly model what should be considered as normal for a device, its behavior must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix based clustering, density based clustering and hierarchical clustering techniques. The resulting clusters are then used to inform the modeling of the normative behaviors of individual devices. At a glance, clustering: (i) Analyzes behavior in the context of other similar devices on the network; (ii) Algorithms identify naturally occurring groupings of devices-impossible to do manually; and (iii) Simultaneously runs a number of different clustering methods to inform the models.

Network Topology

Any cyber threat detection system must also recognize that a network is far more than the sum of its individual parts, with much of its meaning contained in the relationships among its different entities, and that complex threats may often induce subtle changes in this network structure. To capture such threats, the cyber threat defense system employs several different mathematical methods in order to be able to model multiple facets of a networks topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output may contain many inter-related features (protocols, source and destination machines, log changes and rule triggers, etc.). Learning a sparse and consistent structured predictive function is crucial to avoid the curse of over fitting.

In this context, the cyber threat defense system has employed a cutting edge large-scale computational approach to learn sparse structure in models of network behavior and connectivity based on applying L1-regularization techniques (e.g., a lasso method). This allows for the discovery of true associations between different network components and events that may be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber threat defense system uses mathematical analysis and machine learning to detect potential threats, allowing the system to stay ahead of evolving risks. The cyber threat defense system approach means that detection no longer depends on an archive of previous attacks. Instead, attacks may be spotted against the background understanding of what represents normality within a network. No pre-definitions are needed, which allows for the best possible insight and defense against today's threats. On top of the detection capability, the cyber threat defense system may create digital antibodies automatically, as an immediate response to the most threatening cyber breaches. The cyber threat defense system approach both detects and defends against cyber threat. Genuine unsupervised machine learning eliminates the dependence on signature-based approaches to cyber security, which are not working. The cyber threat defense system's technology may become a vital tool for security teams attempting to understand the scale of their network, observe levels of activity, and detect areas of potential weakness. These no longer need to be manually sought out, but are flagged by the automated system and ranked in terms of their significance.

Machine learning technology is the fundamental ally in the defense of systems from the hackers and insider threats of today, and in formulating response to unknown methods of cyber-attack. It is a momentous step change in cyber security. Defense must start within. As such, the threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured I/O problems, such as the observation of packet traffic and host activity within a distributed digital enterprise, where both input and output may contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus, providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Computing Systems

A computing system may be, wholly or partially, part of one or more of the server or client computing devices in accordance with some embodiments. Components of the computing system may include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media may be any available media that may be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which may be used to store the desired information, and which may be accessed by the computing device 900. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM may include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, aa microphone, a pointing device and/or scrolling input component, such as a mouse, trackball or touch pad. The microphone may cooperate with speech recognition software. These and other input devices are often connected to the processing unit through a user input interface that is coupled to the system bus, but may be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system may operate in a networked environment using logical connections to one or more remote computers/client devices, such as a remote computing system. The logical connections may include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design may be carried out on a single computing system and/or on a distributed system in which different portions of the present design are carried out on different parts of the distributed computing system.

Note, an application described herein includes but is not limited to software applications, mobile apps, and programs that are part of an OS. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as Python, C, C++, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components may be duplicated by software emulation. Thus, a software program written to accomplish those same functions may emulate the functionality of the hardware components in input-output circuitry. A module may be implemented with electronic hardware, software stored in a memory, and/or a combination of both to perform its functions as discussed herein.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An endpoint agent client sensor (cSensor) for extending network visibility in an endpoint computing device, comprising:
    a security module configured to have an interface to cooperate with and integrate with an operating system (OS) of the endpoint computing device;
    a network module configured to cooperate with the security module, where the network module is configured to monitor network information coming into and out of the endpoint computing device as a first set of traffic data, where the network module is configured to ingest the first set of traffic data transmitted via one or more connections between a network interface of the endpoint computing device and at least one or more network entities;
    a collation module configured to collect the ingested first set of traffic data from the network module, where the collation module is configured to obtain input data from the collected first set of traffic data, where the input data includes at least an identity of a computing process running in the endpoint computing device at least one of sending the first set of traffic data and receiving the first set of traffic data;
    an analyzer module having an intelligent deep packet inspection (DPI) engine, where the analyzer module is configured to receive the input data from the first set of traffic data being transmitted via the respective connection, wherein the intelligent DPI engine is configured to perform a first predetermined level of DPI on the input data from two or more possible levels of DPI based on one or more network parameters;
    a communication module configured to securely transmit a second set of traffic data to a cyber security appliance located in a network, where the endpoint computing device also is part of the network, wherein the transmitted second set of traffic data is associated with the first predetermined level of DPI performed on the input data from the first set of traffic data;
    an autonomous action module configured to perform one or more autonomous actions itself, rather than a human, in response to a cyber threat that is correlated to at least one of i) the first set of traffic data and ii) the second set of traffic data;
    wherein, in conjunction with the communication module, the analyzer module is configured to thereby transmit the second set of traffic data over a secure connection to the cyber security appliance, and wherein the transmitted second set of traffic data comprises: (i) only all of a derived metadata from a full DPI, (ii) a portion of the derived metadata in conjunction with a remaining portions of the packets from a partial DPI, or (iii) only all of the packets from a non-DPI; and
    where any instructions for the security module, the network module, the collation module, the analyzer module, the communication module, or the autonomous action module in the endpoint agent cSensor are stored on one or more non-transitory computer readable mediums in an executable state, which are to be executed by one or more processing units.

2. The endpoint agent cSensor of claim 1, wherein the one or more autonomous actions comprise at least one or more of blocking a particular connection, blocking a particular type of traffic data, preventing a particular type of activity, and cooperating with the operating system to shut down one or more computing processes running in the endpoint computing device.

3. The endpoint agent cSensor of claim 2, wherein the network entities comprise at least one or more of network infrastructures and network devices.

4. The endpoint agent cSensor of claim 3, wherein the network entities include one at least one or more of virtual sensors (vSensors), operating system sensors (osSensors), and probes.

5. The endpoint agent cSensor of claim 1, wherein the network parameters to determine what predetermined level of DPI from the two or more possible levels of DPI to perform on the input data comprise at least one or more of (i) a particular protocol being used by the first set of traffic data, (ii) a proximity distance between a geographic location of the cSensor and a geographic location of the cyber security appliance, (iii) a particular size of the traffic data under analysis, and (iv) a particular degree of interest for the traffic data under analysis in relation to the respective connection.

6. The endpoint agent cSensor of claim 1, wherein the first predetermined level of DPI comprises at least one or more of a full DPI, a partial DPI, and a non-DPI simple mirroring of information, and wherein the full DPI is configured to process all packets in the first set of traffic data in order to derive all metadata associated with that first set of traffic data, wherein the partial DPI is configured to process a portion of the packets in the first set of traffic data in order to derive a portion of the metadata associated with that first set of traffic data, and wherein the non-DPI is configured to not process any of the packets in the first set of traffic data in order not to derive any of the metadata associated with that first set of traffic data but rather perform simple mirroring of incoming information from the network interface into the endpoint computing device and/or information going out from the endpoint computing device, and which one of these three actions to take on the first predetermined level of DPI is based on the network parameters.

7. An endpoint agent client sensor (cSensor) for extending network visibility in an endpoint computing device, comprising:
   a security module configured to have an interface to cooperate with and integrate with an operating system (OS) of the endpoint computing device;
   a network module configured to cooperate with the security module, where the network module is configured to monitor network information coming into and out of the endpoint computing device as a first set of traffic data, where the network module is configured to ingest the first set of traffic data transmitted via one or more connections between a network interface of the endpoint computing device and at least one or more network entities;
   a collation module configured to collect the ingested first set of traffic data from the network module, where the collation module is configured to obtain input data from the collected first set of traffic data, where the input data includes at least an identity of a computing process running in the endpoint computing device at least one of sending the first set of traffic data and receiving the first set of traffic data;
   an analyzer module having an intelligent deep packet inspection (DPI) engine, where the analyzer module is configured to receive the input data from the first set of traffic data being transmitted via the respective connection, wherein the intelligent DPI engine is configured to perform a first predetermined level of DPI on the input data from two or more possible levels of DPI based on one or more network parameters;
   a communication module configured to securely transmit a second set of traffic data to a cyber security appliance located in a network, where the endpoint computing device also is part of the network, wherein the transmitted second set of traffic data is associated with the first predetermined level of DPI performed on the input data from the first set of traffic data;
   an autonomous action module configured to perform one or more autonomous actions itself, rather than a human, in response to a cyber threat that is correlated to at least one of i) the first set of traffic data and ii) the second set of traffic data;
   wherein the autonomous actions comprise at least one or more of blocking a particular connection, blocking a particular type of traffic data, preventing a particular type of activity, and cooperating with the operating system to shut down one or more computing processes running in the endpoint computing device;
   wherein the network entities comprise at least one or more of network infrastructures and network devices;
   wherein the collation module is further configured to collect network activity data from the network entities, wherein the collation module is configured to cooperate with a coordinator module to correlate one or more causal links between the collected network activity data from the network entities, and wherein the collation module is configured to (i) perform passive ingestion of input data, (ii) perform active collection of input data, (iii) collate connection content for any other modules in the endpoint agent cSensor and/or any other modules in any other sensors, and (iv) understand a plurality of characteristics of a connection event; and
   where any instructions for the security module, the network module, the collation module, the analyzer module, the communication module, or the autonomous action module in the endpoint agent cSensor are stored on non-transitory computer readable mediums in an executable state, which are to be executed by one or more processing units.

8. The endpoint agent cSensor of claim 7, further comprising:
   wherein the security module is further configured to have an interface to cooperate with and integrate with the OS of the endpoint computing device to monitor one or more cyber threats via cooperation with the OS;
   a collection module configured to cooperate with the security module to monitor and collect specified data from one or more computing processes running in the endpoint computing device, wherein the collection and communication modules cooperate with each other to transmit any observed activities to the cyber security appliance, and wherein types of transmitted activities comprise at least one or more of network connection activities, data transfer activities, and behavior pattern activities;
   a cyber threat module configured to detect potentially unusual network activity in order to provide an additional input of information in conjunction with the transmitted activities in order to generate a score or probability corresponding to a level of how harmful a detected potential cyber threat is maliciously harmful to the endpoint computing device; and
   one or more machine learning models configured to cooperate with all available modules in the endpoint agent cSensor that are trained on a normal pattern of life of any network behavior for the network entities.

9. The endpoint agent cSensor of claim 8, wherein a multi-cloud computing services module is configured to monitor and collect data from at least one or more of a Software as a Service (Saas), an Infrastructure as a Service (IaaS), a Platform as a Service (PaaS), and a hybrid service in order to obtain additional information to further contextualize the first set of traffic data under analysis.

10. The endpoint agent cSensor of claim 8, wherein a generated score of probability is factored with a level of how harmful a detected potential cyber threat is maliciously harmful to the endpoint computing device hosting the endpoint agent cSensor.

11. A method for a cyber threat defense system to extend network visibility in an endpoint computing device, comprising:
   configuring a security module with an interface to cooperate with and integrate with an operating system (OS) of the endpoint computing device;
   configuring a network module to cooperate with the security module, where the network module is configured to monitor network information coming into and out of the endpoint computing device as a first set of traffic data, where the network module is configured to ingest the first set of traffic data transmitted via one or more connections between a network interface of the endpoint computing device and at least one or more network entities;
   configuring a collation module to collect the ingested first set of traffic data from the network module, where the collation module is configured to obtain input data from the collected first set of traffic data, where the input data includes at least an identity of a computing process running in the endpoint computing device, at least one of sending the first set of traffic data and receiving the first set of traffic data;

configuring an analyzer module to have an intelligent deep packet inspection (DPI) engine, where the analyzer module is configured to receive the input data from the first set of traffic data being transmitted via the respective connection, wherein the intelligent DPI engine is configured to perform a first predetermined level of DPI on the input data from two or more possible levels of DPI based on one or more network parameters;

configuring a communication module to securely transmit a second set of traffic data to a cyber security appliance located in a network, where the endpoint computing device also is part of the network, wherein the transmitted second set of traffic data is associated with the first predetermined level of DPI performed on the input data from the first set of traffic data;

configuring the collation module is further to collect network activity data from the network entities, wherein the collation module is configured to cooperate with a coordinator module to correlate one or more causal links between the collected network activity data from the network entities, and wherein the collation module is configured to (i) perform passive ingestion of input data, (ii) perform active collection of input data, (iii) collate connection content for any other modules in an endpoint agent cSensor and/or any other modules in any other sensors, and (iv) understand a plurality of characteristics of a connection event; and configuring an autonomous action module to perform one or more autonomous actions itself, rather than a human, in response to a cyber threat, wherein a first triggered autonomous action is correlated to at least one of i) the first set of traffic data and ii) the second set of traffic data received by cyber security appliance.

12. The method for the cyber threat defense system of claim 11, configuring the autonomous action module to perform the one or more autonomous actions of at least one or more of blocking a particular connection, blocking a particular type of traffic data, preventing a particular type of activity, and cooperating with the operating system to shut down one or more computing processes running in the endpoint computing device.

13. The method for the cyber threat defense system of claim 11, wherein the network parameters to determine what predetermined level of DPI from two or more possible levels of DPI to perform on the input data comprise at least one or more of (i) a particular protocol being used by the first set of traffic data, (ii) a proximity distance between a geographic location of the endpoint agent cSensor and a geographic location of the cyber security appliance, (iii) a particular size of the traffic data under analysis, and (iv) a particular degree of interest for the traffic data under analysis in relation to the respective connection.

14. The method for the cyber threat defense system of claim 11, further comprising:
configuring the security module to further have an interface to cooperate with and integrate with the OS of the endpoint computing device to monitor one or more cyber threats via cooperation with the OS;
configuring a collection module to cooperate with the security module to monitor and collect specified data from one or more computing process running in the endpoint computing device, wherein the collection and communication modules cooperate with each other to transmit any observed activities to the cyber security appliance, and wherein types of transmitted activities comprise at least one or more of network connection activities, data transfer activities, and behavior pattern activities;
configuring a cyber threat module to detect potentially unusual network activity in order to provide an additional input of information in conjunction with the transmitted activities in order to generate a score or probability corresponding to a level of how harmful a detected potential cyber threat is maliciously harmful to the endpoint computing device; and
configuring one or more machine learning models to cooperate with all available modules in the endpoint agent cSensor that are trained on a normal pattern of life of any network behavior within a remote network defense system.

15. The method for the cyber threat defense of claim 11, wherein a generated score of probability is factored with a level of how harmful a detected potential cyber threat is maliciously harmful to the endpoint computing device hosting the endpoint agent cSensor.

16. The method for the cyber threat defense system of claim 11, wherein the first predetermined level of DPI comprises at least one or more of a full DPI, a partial DPI, and a non-DPI simple mirroring of information.

17. The method for the cyber threat defense system of claim 16, wherein the full DPI is configured to process all packets in the first set of traffic data in order to derive all metadata associated with that first set of traffic data, wherein the partial DPI is configured to process a portion of the packets in the first set of traffic data in order to derive a portion of the metadata associated with that first set of traffic data, and wherein the non-DPI simple mirroring of information is configured to not process any of the packets in the first set of traffic data in order not to derive any of the metadata associated with that first set of traffic data but rather perform simple mirroring of incoming information from the network input into the endpoint computing device and/or information going out from the endpoint computing device, and which one of these three actions to take on the first predetermined level of DPI is based on the network parameters.

18. A non-transitory storage medium comprising software stored in an executable format, which when executed by one or more processors in a computing device, is configured to cause the computing device to perform the method of claim 11.

19. A method for a cyber threat defense system to extend network visibility in an endpoint computing device, comprising:
configuring a security module with an interface to cooperate with and integrate with an operating system (OS) of the endpoint computing device;
configuring a network module to cooperate with the security module, where the network module is configured to monitor network information coming into and out of the endpoint computing device as a first set of traffic data, where the network module is configured to ingest the first set of traffic data transmitted via one or more connections between a network interface of the endpoint computing device and at least one or more network entities;

configuring a collation module to collect the ingested first set of traffic data from the network module, where the collation module is configured to obtain input data from the collected first set of traffic data, where the input data includes at least an identity of a computing process running in the endpoint computing device, at least one of sending the first set of traffic data and receiving the first set of traffic data;

configuring an analyzer module to have an intelligent deep packet inspection (DPI) engine, where the analyzer module is configured to receive the input data from the first set of traffic data being transmitted via the respective connection, wherein the intelligent DPI engine is configured to perform a first predetermined level of DPI on the input data from two or more possible levels of DPI based on one or more network parameters;

configuring a communication module to securely transmit a second set of traffic data to a cyber security appliance located in a network, where the endpoint computing device also is part of the network, wherein the transmitted second set of traffic data is associated with the first predetermined level of DPI performed on the input data from the first set of traffic data;

configuring an autonomous action module to perform one or more autonomous actions itself, rather than a human, in response to a cyber threat, wherein a first triggered autonomous action is correlated to at least one of i) the first set of traffic data and ii) the second set of traffic data received by cyber security appliance; and configuring a multi-cloud computing services module to monitor and collect data from at least one or more of a Software as a Service (Saas), an Infrastructure as a Service (IaaS), a Platform as a Service (PaaS), and a hybrid service in order to obtain additional information to further contextualize the first set of traffic data under analysis.

20. A non-transitory storage medium comprising software stored in an executable format, which when executed by one or more processors in a computing device, is configured to cause the computing device to perform the method of claim 8.

\* \* \* \* \*